United States Patent [19]

Sukigara et al.

[11] Patent Number: 4,824,898
[45] Date of Patent: Apr. 25, 1989

[54] SHAPED ARTICLE OF A TETRAFLUOROETHYLENE POLYMER

[75] Inventors: Masayuki Sukigara; Yasushi Kaneko, both of Yokohama; Hiroshi Kataoka, Tokyo, all of Japan

[73] Assignee: Asahi Kasei Kogyo Kabushiki Kaisha, Osaka, Japan

[21] Appl. No.: 172,680

[22] Filed: Mar. 24, 1988

[30] Foreign Application Priority Data

Mar. 27, 1987 [JP] Japan .................................. 62-71370
Nov. 27, 1987 [JP] Japan ................................ 62-297340

[51] Int. Cl.⁴ ........................ B29C 17/00; B29C 3/00; C08K 3/10
[52] U.S. Cl. ..................................... 524/401; 524/431; 524/435; 524/440; 524/494; 524/496; 524/546; 525/153; 525/165; 525/178; 525/189; 526/255
[58] Field of Search ................ 526/255; 525/153, 165, 525/178, 189; 524/401, 406, 546, 440, 494, 496, 431, 435

[56] References Cited

U.S. PATENT DOCUMENTS 3,953,412 4/1976 Saito et al. .......................... 524/546
4,194,040 3/1980 Breton et al. ....................... 524/546
4,388,259 6/1983 Jewell et al. ....................... 264/153
4,408,007 10/1983 Kuhls et al. ........................ 524/546
4,598,011 7/1986 Bowman ............................. 428/221

FOREIGN PATENT DOCUMENTS 171131 9/1985 Japan .
405732 3/1974 U.S.S.R. .

Primary Examiner—Herbert J. Lilling
Attorney, Agent, or Firm—Armstrong, Nikaido, Marmelstein & Kubovcik

[57] ABSTRACT

A shaped article comprised of a tetrafluoroethylene polymer with a number average molecular weight of at least about $10^6$ which exhibits specific heat shrinking properties represented by an average maximum expansion ratio of from 2 to 10, a least maximum shrinkage ratio of 0.71 or less, an orientation release stress at 200° C. of less than 5 Kg/cm² and a shrinking starting temperature of at least 80° C. The shaped article has excellent compression creep resistance, compression resistance, impact strength, dimensional stability, gas barrier property and tensile strength. Accordingly, it can be advantageously utilized as a sealant, a lining material, a bearing pad, a sliding pad, etc.

10 Claims, 13 Drawing Sheets

FIG. 1
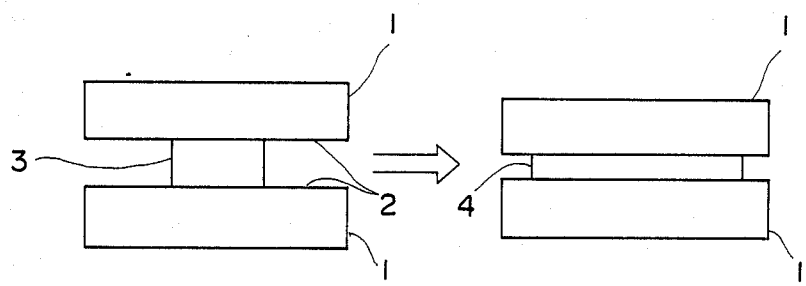
FIG. 2
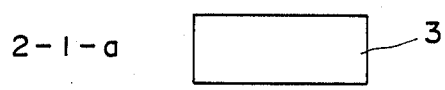
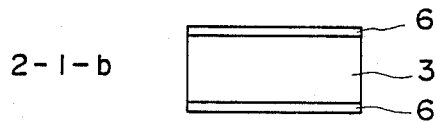
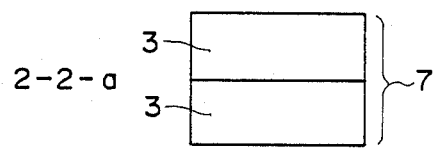
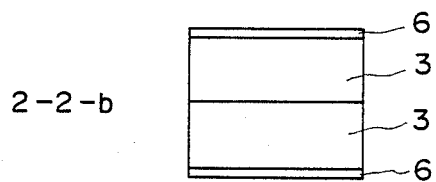

FIG. 12
(a)
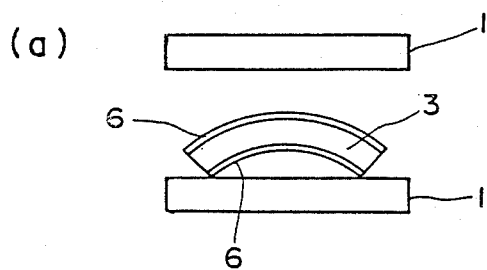
(b)
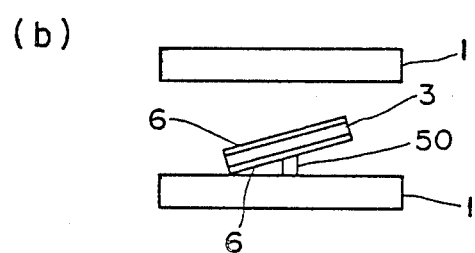
(c)
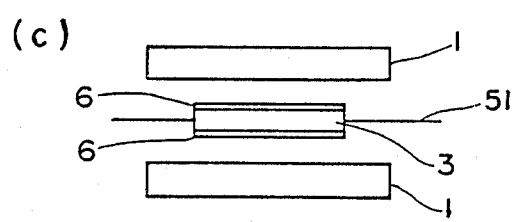

SHAPED ARTICLE OF A TETRAFLUOROETHYLENE POLYMER

BACKGROUND OF THE INVENTION

1. Field of The Invention

This invention relates to a shaped article of a tetrafluoroethylene polymer. More particularly, the present invention is concerned with a shaped article of a tetrafluoroethylene polymer of ultrahigh molecular weight which article has specific values with respect to a specific gravity, an orientation release stress, a shrinking starting temperature, an average maximum expansion ratio and a least maximum shrinkage ratio. The shaped article has excellent creep resistant and gas barrier properties, and has excellent dimensional stability and impact strength. Accordingly, it can be advantageously used as a sealant such as a gasket and a packing, as a lining material, a bearing pad, a sliding pad, sliding parts such as a bushing, a bearing and a piston ring, or the like. Especially, advantageous application of the present shaped article is found in packing, gaskets and bearings for automobile mechanical parts which must have high dimensional stability and impact strength at high temperatures.

2. Discussion of Related Art

Polytetrafluoroethylene is now an important engineering material due to its various excellent properties. In industry, polytetrafluoroethylene is now widely used as a sealant material such as a gasket and a packing, a lining material or the like, since the polymer is excellent in its resistance to chemicals, heat, and low temperatures, and has low frictional properties, non-staining properties, tack-free properties, electrical insulating properties and the like.

The melt viscosity of polytetrafluoroethylene is extremely high as compared with those of ordinary thermoplastic resins such as polystyrene, polyethylene, polyamide, acrylic resin and the like. Polytetrafluoroethylene has a melt viscosity as high as about $10^{11}$ poises even at a temperature of about 380° C. which is higher than its melting temperature (327° C.), whereas the melt viscosities of the ordinary thermoplastic resins are only about $10^3$ to $10^4$ poises at their melting temperatures. Due to such extremely high melt viscosity, polytetrafluoroethylene cannot be molded by the customary molding techniques such as melt extrusion, injection molding and the like which are generally employed for the molding of these ordinary thermoplastic resins. The methods which are useful for molding polytetrafluoroethylene are limited to special methods, for example, those called compression molding, ram extrusion molding and paste extrusion molding, in which a polytetrafluoroethylene powder is compressed under an appropriate pressure to obtain a molded article and the molded article is sintered at a temperature which is higher than the melting temperature thereof, followed by cooling. With respect to these methods, reference may be made, for example, to pages 53 to 54 of Satokawa et al "Fusso Jushi (Fluoro Resins)" published by the Nikkan Kogyo Shimbun Ltd., Tokyo, Japan, in April, 1976.

Further, it is noted that the temperature up to which polytetrafluoroethylene can be used when no load is applied thereto is 260° C. However, in many applications, polytetrafluoroethylene is used under load, and the critical temperature up to which an article of polytetrafluoroethylene can be stably used is far lower than 260° C., although it varies depending on the structure, configuration and field of application of the article. This is largely because polytetrafluoroethylene has an inherent creeping property under load, especially at high temperatures.

In the field of gaskets, primarily, two measures have been taken to deal with the problem of polytetrafluoroethylene creeping. One is to incorporate a filler material such as glass fiber, graphite, carbon fiber and zirconium oxide into the polytetrafluoroethylene. The other is to combine polytetrafluoroethylene or a filler material-incorporated polytetrafluoroethylene as mentioned above with a material having less of a tendency to creep, as seen in jacketed and spiral wound gaskets. However, the gaskets comprised of polytetrafluoroethylene and a filler material are not satisfactory since the gaskets are still insufficient in creep resistant properties at high temperatures, and since some types of filler materials cause the gaskets to have a decreased resistance to chemicals. On the other hand, the jacketed and spiral wound gaskets are disadvantageous in that for these, a high clamping pressure is needed and that they cannot be formed into complex forms. Therefore, there is still a strong demand in the art for polytetrafluoroethylene-based gaskets which have excellent creep resistant properties and are free from the above-mentioned disadvantages. With respect to the sealants as well, such as valve sealants, e.g. ball valve seats and gate valve seats, and dynamic sealants, e.g. gland packings, U packings and V packings, for which polytetrafluoroethylene is also advantageously used when they are required to have anticorrosive properties, improvement of the compression creep resistance of the article is also strongly desired in the art for the reasons as mentioned above with respect to the gaskets.

Monoaxially oriented tetrafluoroethylene polymer sheets as obtained by rolling the polymer under pressure exhibit an improved compression creep resistance as compared to that of non-oriented tetrafluoroethylene polymer sheets. However, for example, when a compressive force is applied to a sheet-form article of a monoaxially oriented tetrafluoroethylene polymer at a high temperature, e.g. 100° C. or more, the article is shrunk in the counter-stretching direction, and is expanded in a direction perpendicular to the counter-stretching direction in a plane along the surface of the sheet. As a result, a substantial dimensional change occurs in the article. On the other hand, however, if a tetrafluoroethylene polymer is stretched without applying any pressure thereto, the resultant article is porous so that it is not suitable for the usages intended in the present invention.

The foregoing measure for dealing with the creeping property of polytetrafluoroethylene are not satisfactory since all of them have the drawbacks as mentioned above. Recently, proposals have been made to provide more satisfactory measures for dealing with the drawbacks of polytetrafluoroethylene articles. See U.S. Pat. No. 4,388,259 and U.S.S.R. Pat. No. 405,732. Specifically, to improve the creep resistant properties of a polytetrafluoroethylene gasket, it has been proposed, as disclosed in U.S. Pat. No. 4,388,259, to manufacture a gasket by a method comprising (a) heating a fluorocarbon polymer sheet of predetermined thickness to a temperature within the range at which the fluorocarbon polymer enters the gel state; (b) compressing said heated sheet to a thickness less than the above-mentioned predetermined thickness; (c) cooling the sheet in its compressed state; and (d) cutting the sheet, in its compressed, cooled state, into a gasket. However, the gaskets as manufactured according to the method of the patent do not have desirable creep resistant properties. On the other hand, with respect to U.S.S.R. Pat. No. 405,732, in one of the two Examples described in the specification thereof there is disclosed a rolling of polytetrafluoroethylene to attain a high orientation of the polymer. Rolling is generally employed to produce a monoaxially oriented continuous sheet. In the roll orientation, it is necessary to conduct rolling at elevated temperatures while applying the tensile force in the lengthwise direction of the sheet and to release the tensile force after cooling the sheet. Rolling is not suitable for effecting biaxial or multiaxial orientation of the polymer molecules. The other Example of the U.S.S.R. patent discloses compression of a preformed sheet of polytetrafluoroethylene in a press mold corresponding in form and dimension to the ultimate packing so as to cause the ratio of the thickness of the preformed sheet to the thickness of the ultimate packing to be 1.2 or more, which ratio may be regarded as a draw ratio. However, according to this method, this ratio is at most about 2.0 and a shaped article of a highly oriented polytetrafluoroethylene such as that having a draw ratio greater than about 2 cannot be obtained. The products obtained in the U.S.S.R. patent do not have desirable creep resistant properties.

Polytetrafluoroethylene is also important as an anticorrosive lining material. However, it has a drawback in that it tends to be accompanied by a blistering phenomenon, especially when it is employed in a pipe through which a gas-phase fluid is passed. The blistering is fatal from a viewpoint of the purpose of the lining. Hence, improvement of the blistering resistant properties of the poly tetrafluoroethylene article is strongly desired in the art. The blistering resistant properties of the polytetrafluoroethylene article can be represented by the gas barrier properties of the article. That is, a polytetrafluoroethylene article having improved gas barrier properties exhibits improved blistering resistant properties, and a polytetrafluoroethylene article having poor gas barrier properties exhibits poor blistering resistant properties.

Also, there are instances where tetrafluoroethylene polymer gaskets and linings suffer serious cracks and damages due to their poor impact strength. Accordingly, there is a strong demand in the art for a tetrafluoroethylene polymer article having desirable impact strength.

SUMMARY OF THE INVENTION

Extensive and intensive studies have been conducted with a view toward developing an article of a tetrafluoroethylene polymer which is free from the above-mentioned drawbacks of the conventional tetrafluoroethylene polymer articles. As a result, it has been found that tetrafluoroethylene polymer articles having desirable creep resistant and gas barrier properties can be obtained by conducting compression molding or extrusion molding of a tetrafluoroethylene polymer in a specific manner. However, it has been found that their dimensional stability and impact strength are not sufficient. Therefore, the present inventors have conducted further investigations, and have unexpectedly found that in order to avoid the disadvantageous dimensional change, the orientation release stress at 200° C. of the shaped article, which is generally 5 Kg/cm$^2$ or more when the average maximum expansion ratio, as defined later, of the article is at least 2.0, must be decreased to less than 5 Kg/cm$^2$ by subjecting the article to specific shrinking treatment. Moreover, the present inventors have unexpectedly found that the above tetrafluoroethylene polymer articles which have specific values with respect to a specific gravity, shrinking starting temperature and least maximum shrinkage ratio as defined later have also improved impact strengths. Based on these novel unexpected findings, the present invention has been completed.

It is, therefore, an object of the present invention to provide a novel shaped article of a tetrafluoroethylene polymer having improved creep resistant properties which can be advantageously utilized, especially as an anticorrosive sealant material, which requires high compression resistance, especially high compression creep resistance, and high mechanical strength.

It is another object of the present invention to provide a novel shaped article of a tetrafluoroethylene polymer having improved gas barrier properties, which article is appreciated as a high quality lining material due to its improved anti-blistering properties.

It is a further object of the present invention to provide a novel shaped article of a tetrafluoroethylene polymer having excellent dimensional stability and excellent impact strength, which can be advantageously utilized especially as packing, gaskets and bearings for automobile mechanical parts.

The foregoing and other objects, features and advantages of the present invention will be apparent to those skilled in the art from the following detailed description and appended claims taken in connection with the accompanying drawings.

BRIEF DESCRIPTION OF THE DRAWINGS

In the drawings:

FIG. 1 shows a diagrammatic explanatory view illustrating a mode of orienting a preformed tetrafluoroethylene polymer sheet by the use of compression dies;

FIG. 2 shows a set of diagrammatic explanatory views illustrating a preformed tetrafluoroethylene polymer sheet to be subjected to orientation (2-1-a), a preformed tetrafluoroethylene polymer sheet sandwiched between films which is to be subjected to orientation (2-1-b), two preformed tetrafluoroethylene polymer sheets, one piled on the other, which are to be subjected to orientation (2-2-a), and two preformed tetrafluoroethylene polymer sheets, one piled on the other and sandwiched between films, which polymer sheets are to be subjected to orientation (2-2-b);

FIG. 12 shows a set of diagrammatic explanatory views illustrating various modes for placing a preformed tetrafluoroethylene polymer article between opposing dies having a surface temperature lower than the temperature corresponding to the surface temperature of the preformed article minus 50° C., in which (a) a preformed article having a curved form is employed, (b) a support is put on the lower die and the preformed article is rested on the support, and (c) the preformed article is hung by means of a metal wire in the space between the opposing dies;

In FIGS. 1 through 16, like parts or portions are designated by like numerals.

DETAILED DESCRIPTION OF THE INVENTION

Figure 3:
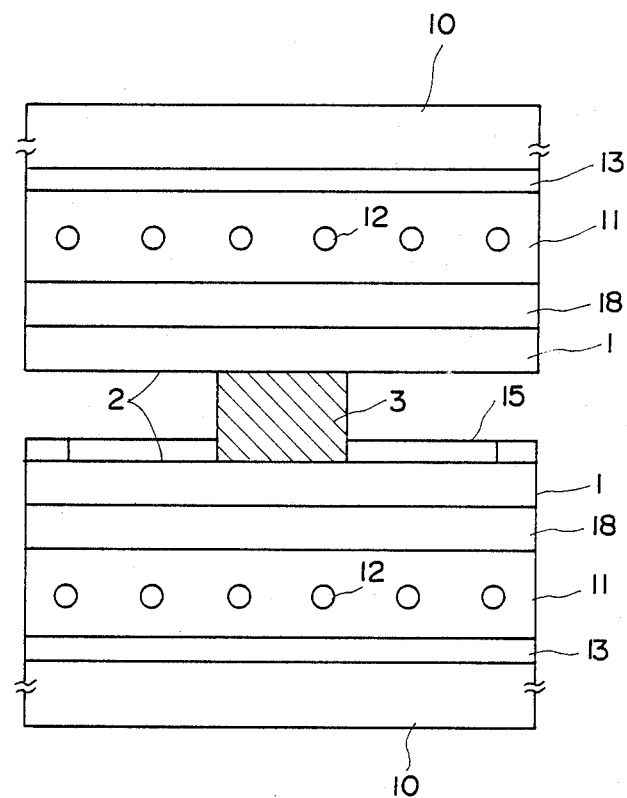
FIG. 3 shows a diagrammatic explanatory view illustrating the structure of a compression press which is suitable for orienting a preformed tetrafluoroethylene polymer sheet.

According to the present invention, there is provided a shaped article comprising a tetrafluoroethylene polymer having a number average molecular weight of at least about $10^6$, which article has a specific gravity of at least 1.8 and an orientation release stress at 200° C. of less than 5 Kg/cm$^2$, and which article has a shrinking starting temperature of at least 80° C. as measured by thermomechanical analysis (to be described below) and has heat shrinking properties such that upon heating to a temperature higher than the shrinking starting temperature, shrinking occurs in a plurality of planes contiguously aligned in substantially parallel relationship within the shaped article and simultaneously expansion occurs in a direction perpendicular to said planes, wherein said shaped article exhibits an average maximum expansion ratio of from 2 to 10 as measured in terms of a ratio of a maximum expansion in the direction perpendicular to said planes and a least maximum shrinkage ratio of 0.71 or less as measured in terms of a ratio of a maximum shrinkage in a direction in which the maximum shrinkage is least.

The configuration of the shaped article of the present invention is not critical. Generally, however, it is in a sheet form. The term "sheet" is used herein in its broadest sense, and means any wide, thin piece of material including those usually called "film" and "plate". The sheet-form article of the present invention may be flat or curved. The flat sheet-form article may be, for example, in a disk form or a ring form. The curved sheet-form article may be, for example, in a cylindrical form, a columnar form, a dish form or a pipe form. The flat sheet-form article and curved sheet-form article according to the present invention may be manufactured in substantially the same manner. For example, both may be manufactured by subjecting a preformed article to compression molding or extrusion molding and then to shrinking treatment as described later. In the compression molding or extrusion molding, use is made of dies, each having a flat surface in the case of manufacturing a flat sheet-form article and dies each having a curved surface in the case of manufacturing a curved sheet-form article. As is customary in the art, a shaped article having a complicated configuration may be manufactured by blanking or machining a shaped article having a simple configuration. The thickness of the sheet-form shaped article according to the present invention may be appropriately selected according to the use of the article. Generally, however, the thickness of the shaped article of the present invention is at least 0.05 mm, preferably in the range of from 0.1 to 25 mm.

The tetrafluoroethylene polymer, to be used as a matrix resin of the shaped article of the present invention, may be a homopolymer of tetrafluoroethylene or a copolymer of tetrafluoroethylene with a comonomer having a tetrafluoroethylene content of at least 70% by mole, preferably at least 90% by mole. The tetrafluoroethylene polymer may also be a blend of the homopolymer and a copolymer or a blend of copolymers. The tetrafluoroethylene polymer should be of an ultrahigh molecular weight and, specifically, the number average molecular weight, as determined from the standard specific gravity in accordance with the method described later, of the polymer may generally be in the range of from about $10^6$ to about $10^8$, preferably from about $2 \times 10^6$ to about $10^8$, more preferably from about $5 \times 10^6$ to about $5 \times 10^7$. Of the tetrafluoroethylene polymers as mentioned above, the homopolymer of tetrafluoroethylene of ultrahigh molecular weight is most preferred. Examples of the above-mentioned comonomer include perfluoroalkyl vinyl ethers, hexafluoropropylene, ethylene, chlorotrifluoroethylene, vinyl fluoride, vinylidene fluoride, trifluoroethylene, perfluorobutadiene, perfluoroolefins, perfluoroalkylacrylic esters and propylene. The tetrafluoroethylene polymers are known in the art and may be produced according to customary procedures.

The shaped article of the present invention may contain at least one filler material selected from inorganic filler materials such as glass fiber, carbon fiber, graphite, carbon black, molybdenum disulfide, bronze, zirconium oxide, zirconium silicate, boron whisker and the like, and organic filler materials such as an aromatic polyamide fiber, an aromatic polyester fiber, polyphenylene sulfide, polysulfone, polyether-sulfone, polyamide-imide, aromatic polyimide, polyether-imide, polyether-ether-ketone, and polyether-ketone. The filler material content of the shaped article is not critical, but is preferably not greater than about 60% by weight. The shaped article of the present invention may further contain other types of thermoplastic resins such as polyethylene, polyvinyl chloride, polystyrene, polyvinyl acetate, polymethyl methacrylate, polypropylene, ABS resin, poly-4-methylpentene-1, polycarbonate, polyamides, polyacetal, polyphenylene oxide polybutylene terephthalate, and polyethylene terephthalate, and may also contain an additive such as a plasticizer, a dye or the like. It is preferred that the content of those in the shaped article do not exceed about 10% by weight.

It is preferred that the tetrafluoroethylene polymer of the shaped article of the present invention be at least biaxially oriented. The terminology "at least biaxially oriented tetrafluoroethylene polymer" as used herein means that the tetrafluoroethylene polymer is biaxially oriented or multiaxially oriented. In the case of biaxial orientation, the polymer is stretched in two directions perpendicular to each other to form a shaped article so that the polymer molecules of the article are principally oriented in the two stretching directions. On the other hand, in the case of multiaxial orientation, the polymer is subjected to, for example, compression molding or extrusion molding as described later so that the polymer molecules of the resulting article are almost uniformly oriented in all directions (360°). In the present invention, at least biaxially oriented tetrafluoroethylene polymers are preferred to monoaxially oriented tetrafluoroethylene polymers as obtained by stretching in a single direction or rolling these polymers so as to cause the molecules of these polymers to be monoaxially oriented. Even an article of a monoaxially oriented tetrafluoroethylene polymer may exhibit an improved compression creep resistance as compared to that of the non-oriented tetrafluoroethylene polymer article. However, for example, when a compressive force is applied to a sheet-form article of a monoaxially oriented tetrafluoroethylene polymer at a high temperature, i.e. 100° C. or more, the article is shrunk in the counter-stretching direction, and is expanded in a direction perpendicular to the counter-stretching direction in a plane along the surface of the sheet. As a result, a substantial anisotropic dimensional change occurs in the article. Hence, the monoaxially oriented polymer article may have problems in the actual applications. With respect to the shaped articles in which biaxially and multiaxially oriented tetrafluoroethylene polymers are used as a matrix resin, such undersirable anisotropic dimensional change does not occur. The multiaxially oriented tetrafluorethylene polymer is generally more preferable than the biaxially oriented tetrafluoroethylene polymer.

The shaped article of the present invention has a shrinking starting temperature of at least 80° C. as measured by thermomechanical analysis as explained in detail below and has heat shrinking properties such that upon heating to a temperature higher than the shrinking starting temperature, shrinking occurs in a plurality of planes contiguously aligned in substantially parallel relationship within the shaped article and simultaneously expansion occurs in a direction perpendicular to said planes. The shaped article exhibits an average maximum expansion ratio of from 2 to 10 as measured in terms of a ratio of a maximum expansion in the direction perpendicular to said planes and a least maximum shrinkage ratio of 0.71 or less as measured in terms of a ratio of a maximum shrinkage in a direction in which the maximum shrinkage is least.

Figure 4:
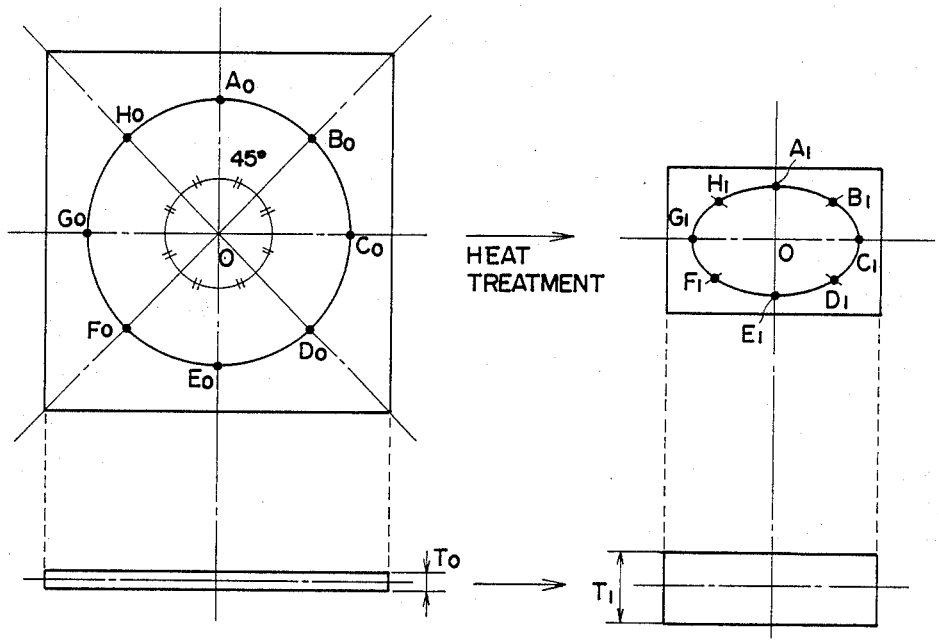
FIG. 4 shows diagrammatic explanatory views illustrating how the average maximum expansion ratio and least maximum shrinkage ratio are measured with respect to a sheet-form shaped article of a tetrafluoroethylene polymer.

The terminologies "average maximum expansion ratio" and "least maximum shrinkage ratio" as used herein are explained in detail below with reference to FIGS. 4 and 5. Referring to the left side view of FIG. 4, a circle having a radius r, for example 50 mm, is drawn at 25° C. on the surface of a test specimen (a) of for example, 110 mm in length and 110 mm in width, blanked from a sheet-form article of a tetrafluoroethylene polymer. From the center (0) of the circle, four lines are drawn radially at angular intervals of 45°. The intersecting points of the four lines with the circle are denoted as $A_0$, $B_0$, $C_0$, $D_0$, $E_0$, $F_0$, $G_0$ and $H_0$. The thickness of the article is measured at each of the intersecting points. Thus, thicknesses $T_{0a}$, $T_{0b}$, $T_{0c}$, $T_{0d}$, $T_{0e}$, $T_{0f}$, $T_{0g}$ and $T_{0h}$ are obtained at points $A_0$, $B_0$, $C_0$, $D_0$, $E_0$, $F_0$, $G_0$ and $H_0$, respectively. The average of $T_{0a}$, $T_{0b}$, $T_{0c}$, $T_{0d}$, $T_{0e}$, $T_{0f}$, $T_{0g}$ and $T_{0h}$ is denoted as $T_0$. The specimen (a) is subjected to heat treatment in which the specimen is heated at 380° C. for 5 hours after the whole portions thereof have reached the temperature. By the heat treatment, if the article has been oriented, the orientation of the article is released. That is, shrinking occurs in a plurality of planes which are supposed to be present in the shaped article along the orientation direction thereof, and which are supposed to be contiguously aligned in substantially parallel relationship within the article. Simultaneously with the shrinking, expansion occurs in a direction perpendicular to the above-mentioned planes. As a result of the release of orientation, the size of the tetrafluoroethylene polymer article becomes substantially the same as that of the article before the orientation, thereby obtaining specimen (b) as shown on the right side of FIG. 4. Points $A_1$, $B_1$, . . . , $H_1$ indicated with respect to specimen (b) correspond $A_0$, $B_0$, . . . , $H_0$ indicated with respect to specimen (a), respectively. Thicknesses $T_{1a}$, $T_{1b}$, $T_{1c}$, $T_{1d}$, $T_{1e}$, $T_{1f}$, $T_{1g}$ and $T_{1h}$ are measured at points $A_1$, $B_1$, $C_1$, $D_1$, $E_1$, $F_1$, $G_1$ and $H_1$, respectively. The average of $T_{1a}$, $T_{1b}$, $T_{1c}$, $T_{1d}$, $T_{1e}$, $T_{1f}$, $T_{1g}$ and $T_{1h}$ is denoted as $T_1$. The average maximum expansion ratio D is defined as the ratio of the average thickness of specimen (b) to that of specimen (a). That is, $D = T_1/T_0$. On the other hand, the least maximum shrinkage ratio is defined as $OM_1/r$ wherein $OM_1$ represents the maximum of the distances between origin 0 and the circumference of the region defined by $A_1$, $B_1$ . . . , $H_1$ on specimen (b). In FIG. 4, $OM_1 = OG_1 = OC_1$. The circle drawn on the surface of the shaped article shrinks in the directions counter to the directions of stretching and in the degrees corresponding to the degrees of stretching. The circle generally shrinks into an ellipse as illustrated in the right-hand view of FIG. 4. The straight lines including the largest diameter and the smallest diameter are hereinafter referred to as the lateral axis of orientation and the longitudinal axis of orientation, respectively.

The above-defined least maximum shrinkage ratio of the shaped article according to the present invention is 0.71 or less. Shaped articles of a tetrafluoroethylene polymer having a least maximum shrinkage ratio of more than 0.71 disadvantageously have characteristics similar to those of an article of a monoaxially oriented tetrafluoroethylene polymer. That is, when a pressure of, for example, more than 100 Kg/cm² is applied to such a shaped article of a tetrafluoroethylene polymer at a temperature of more than 100° C., the compression set of the article may be small, but anisotropic dimensional changes occur.

In biaxial orientation, generally, the two axes of stretching may be in the same plane and perpendicular to each other. The directions of two such axes are respectively referred to as the "longitudinal direction" and the "lateral direction" in the following descriptions for the sake of convenience. In general, in the biaxial orientation, the ratio of the maximum shrinkage ratio in the longitudinal direction to the maximum shrinkage ratio in the lateral direction may be arbitrarily varied. However, the above-mentioned ratio with respect to the shaped article of a biaxially oriented tetrafluoroethylene polymer according to the present invention is preferably in the range of from 3:1 to 1:1, more preferably from 1.5:1 to 1:1. Shaped articles of an oriented tetrafluoroethylene polymer having a ratio of the maximum shrinkage ratio in the longitudinal direction to the maximum shrinkage ratio in the lateral direction of more than 3:1 disadvantageously tend to have characteristics similar to those of an article of a monoaxially oriented tetrafluoroethylene polymer, and tend to be accompanied by an anisotropic dimensional change which is especially undesired for sealant materials. On the other hand, with respect to the shaped article of a multiaxially oriented tetrafluoroethylene polymer according to the present invention, it is preferred that the maximum shrinkage ratios be approximately identical in all of the directions of the orientation. That is, with respect to the shaped article of a multiaxially oriented tetrafluoroethylene polymer according to the present invention, the ratio of the maximum shrinkage ratio in the direction of orientation in which the maximum shrinkage ratio is the least, to the maximum shrinkage ratio in the direction of orientation in which the maximum shrinkage ratio is the largest, (hereinafter referred to as the ratio of the least maximum shrinkage ratio to the largest maximum shrinkage ratio), is preferably in the range of from 1:1 to 1:2, more preferably from 1:1 to 1:1.5, most preferably from 1:1 to 1:1.2.

Figure 5:
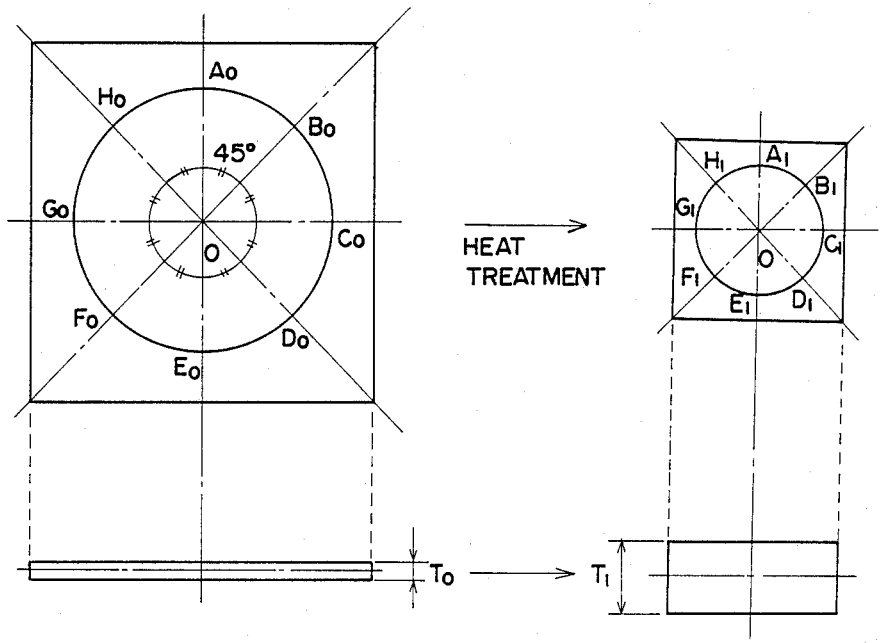
FIG. 5 shows diagrammatic explanatory views which are similar to those of FIG. 4, wherein measurement is done with respect to a multiaxially oriented tetrafluoroethylene polymer article.

With respect to the shaped article of a tetrafluoroethylene polymer according to the present invention, it is preferred that the maximum shrinkage ratio in every direction of orientation of the article be substantially identical, as illustrated in FIG. 5. Generally, with respect to the shaped article of the present invention, the standard deviation ($\sigma$) of the maximum shrinkage ratios in varied directions ($OA_1/r$, $OB_1/r$, $OC_1/r$, $OD_1/r$, $OE_1/r$, $OF_1/r$, $OG_1/r$, and $OH_1/r$) satisfies the inequality $\sigma \leq 0.20$. In the present invention, the multiaxial orientation is considered to be a special case of at least biaxial orientation, and the terminology "multiaxially oriented" is intended to mean an oriented state in which the standard deviation ($\sigma$) of the maximum shrinkage ratios satisfies the inequality $\sigma \leq 0.15$, preferably $\sigma \leq 0.10$.

The tetrafluoroethylene polymer shaped article of the present invention has an average maximum expansion ratio of from 2 to 10. Biaxial or multiaxial orientation of a preformed article of a tetrafluoroethylene polymer having a number average molecular weight of at least about $10^6$ enables the resultant shaped article to have improved compression creep resistant properties. As a result of the study regarding the relationship between average maximum expansion ratio and compression creep resistant properties, it has been found that a shaped article having an average maximum expansion ratio of at least 2.0, preferably at least 3.0, has excellent compression creep resistant properties. When the average maximum expansion ratio is not greater than about 5, the compression creep resistant properties of the shaped article are improved in proportion to the average maximum expansion ratio. On the other hand, when the average maximum expansion ratio is greater than about 5, the dependence of the compression creep resistant properties on the average maximum expansion ratio is decreased even at high temperatures, e.g. 200° C. or more and even under a high compression such as 500 Kg/cm² or more. That is, the shaped article comes to exhibit stable compression creep resistant properties irrespective of the change of the average maximum expansion ratio. Orientation of a preformed tetrafluoroethylene polymer article so as to provide an ultimate shaped article having an average maximum expansion ratio exceeding 10 is not feasible since the preformed article would break. Generally, it is preferred that the average maximum expansion ratio of the shaped tetrafluoroethylene polymer article be in the range of from 3 to 7.

The shaped article of a tetrafluoroethylene polymer according to the present invention is a solid material containing substantially no voids and has a specific gravity of 1.8 or more preferably 2.0 or more, more preferably 2.1 or more. In the present invention, the specific gravity is determined in accordance with ASTM D 792.

The shaped article of an oriented tetrafluoroethylene polymer as obtained by orienting a preformed article of a tetrafluoroethylene polymer between opposing dies under pressure so as to cause the resultant article to have an average maximum expansion ratio of, for example 3.0 or more, exhibits desirable creep resistant and gas barrier properties. However, the shaped article undergoes undesirable reversion of the orientation, especially at elevated temperatures, e.g. about 70° to 100° C. For example, when such an oriented article is allowed to stand in the air at 80° C. for 20 hours, an undesirable dimensional change (shrinkage in length) as large as about 3% disadvantageously occurs as a result of the reversion of the orientation. The present inventors have unexpectedly found that when the orientation release stress at 200° C. of the shaped article, which is generally 5 Kg/cm² or more when the average maximum expansion ratio of the article is at least 2.0, is decreased to less than 5 Kg/cm² by subjecting the article to shrinking treatment, the above-mentioned undesirable dimensional change can be avoided.

The terminology "shrinking starting temperature" as used herein means a temperature at which, in a thermomechanical analysis in which the temperature of the specimen is elevated by heating under the conditions described later and the dimensional change of the specimen is measured, the sample having undergone expansion with the elevation of the temperature starts to shrink with further elevation of the temperature. The present inventors have found that the shaped articles of a tetrafluoroethylene polymer having a shrinking starting temperature of at least 80° C., preferably at least 125° C., more preferably at least 150° C., have excellent dimensional stability. The present inventors have also found that the shrinking starting temperature of the shaped articles of an oriented tetrafluoroethylene polymer is increased from less than 80° C. to 80° C. or more by shrinking treatment after the orientation, and the shaped article having an increased shrinking starting temperature is excellent in dimensional stability and impact strength.

The shaped articles according to the present invention have excellent impact strength. With respect to the shaped articles according to the present invention, the present inventors have found that there are the following relationships between the Izod impact strength "Y" (Kg cm/cm, notched) at 23° C. as measured in accordance with ASTM-D 256 and the average maximum expansion ratio "D":

$$Y \geqq 4.0 \, D + I_0,$$

preferably, $$Y \geqq 4.0 \, D + I_0 + 2$$

wherein $I_0$ represents a constant depending on the type of the tetrafluoroethylene polymer.

The method for manufacturing the shaped article of the present invention is not critical. Generally, however, the present shaped article is manufactured by preparing a preformed article of a tetrafluoroethylene polymer having a number average molecular weight of at least about $10^6$ through molding and sintering as mentioned later and subjecting the resultant preformed article to orientation and then shrinking treatment so as to cause the article to have a specific gravity of at least 1.8, an average maximum expansion ratio of from 2 to 10, a least maximum shrinkage ratio of 0.71 or less, an orientation release stress at 200° C. of less than 5 Kg/cm² and a shrinking starting temperature of at least 80° C.

The preformed article may be manufactured according to customary procedures. For example, this article may be manufactured by compressing a tetrafluoroethylene polymer powder at about room temperature and under a pressure of from about 100 to about 1000 Kg/cm² to thereby form a molded article, sintering the molded article at a temperature greater than that at which the polymer enters the gel state, preferably not lower than 327° C., more preferably from 340° to 400° C., and cooling the sintered article. It is desirable that the preformed article have a specific gravity of at least 1.8, preferably at least 2.

As generally known polymer orientation methods, there may be mentioned the roll orientation method and the pull stretching orientation method. However, the roll orientation method is not suitable in the present invention, since by the method, preferably biaxially or multiaxially oriented tetrafluoroethylene polymer articles cannot be obtained. Also, the pull stretching method is not suitable in the present invention, since the products produced by the method disadvantageously have voids. Effective orientation of the above-mentioned preformed article of a tetrafluoroethylene polymer as produced according to customary procedures may be conducted in the present invention by subjecting the preformed article to compression molding or extrusion molding in which the polymer flows in a fashion known as plug flow (or piston flow) in the dies. The preformed article of the tetrafluoroethylene polymer may be preheated prior to the orientation thereof to a temperature of 150° C. or more, preferably 170° to 340° C., more preferably 250° to 340° C., most preferably 300° to 327° C. The distribution of the temperature in the preheated preformed article may be either uniform or non-uniform. For example, the preheating may be effected in such a non-uniform manner that the preheated article has a relatively high temperature on its surfaces and a relatively low temperature in its central portion, or that only the surface of the preformed article of the tetrafluoroethylene polymer has a temperature higher than the melting point of the tetrafluoroethylene polymer and the remaining inner portions of the preformed article have a temperature lower than the melting point of the tetrafluoroethylene polymer.

In effecting compression molding or extrusion molding, the temperature of the dies may be determined taking into account the moldability of the tetrafluoroethylene polymer, which may vary depending on the composition of the polymer, and the production rate of the article. It is generally preferred that the temperature of the inner surfaces of the dies be in the range of from about room temperature to about 400° C.

In case the temperature of the inner surfaces of the opposing dies is lower than the temperature corresponding to the temperature of the surfaces of the preformed tetrafluoroethylene polymer article minus 50° C. or more, especially minus 100° C. or more, if in the usual manner the preformed article of sheet form is directly placed on the lower die while leaving the upper surface of the article not contacting the upper die, only the lower side of the article which is in contact with the lower die is caused to be rapidly cooled. This brings about a large temperature difference between the upper and lower surface portions of the preformed article, which leads to a difficulty in attaining orientation which is uniform throughout the upper and lower surface portions. To avoid this problem, for example, the following measures can be taken. One is to employ a preformed tetrafluoroethylene polymer article having a curved form as illustrated in FIG. 12(a). Another is to put a support on the lower die and to rest the preformed article on the support, as illustrated in FIG. 12(b). A third possible measure is to hang the preformed article in the space between the opposing dies by means of a tool, e.g. a metal wire, as illustrated in FIG. 12(c).

The compression pressure to be applied to the preformed article of the tetrafluoroethylene polymer in effecting compression molding or extrusion molding is about 300 Kg/cm² or more, preferably about 500 Kg/cm² or more, more preferably from about 1000 to about 4000 Kg/cm².

In manufacturing the shaped article of the present invention, it is extremely important to conduct the orientation of the preformed article of a tetrafluoroethylene polymer under conditions such that the plug flow of the polymer is produced. To produce the plug flow of the polymer, it is preferred to effect at least one of the following procedures in the orientation step:

(1) to apply a lubricant to the inner surfaces of the dies; and (2) to laminate on the preformed article of the tetrafluoroethylene polymer a film of a tetrafluoroethylene polymer or other thermoplastic resin which preferably has a melting point lower than the melting point of the tetrafluoroethylene polymer and/or a melt viscosity lower than the melt viscosity of the tetrafluoroethylene polymer.

The lubricant may be applied to the inner surfaces of the dies in the following manner. In the case of compression molding, the lubricant may be applied to the inner surfaces of the dies before molding. In the case of extrusion molding, the lubricant may be introduced, slowly, stably and continuously, into the extrusion dies or may be applied to the inner surfaces of the dies during molding. Various known lubricants may be employed in the present invention. Of these, however, a silicone oil may be most suitable because it has excellent heat resistance.

The laminating on a preformed article of a tetrafluoroethylene polymer a film of a tetrafluoroethylene polymer or other thermoplastic resin has the effects of not only ensuring the plug flow of the tetrafluoroethylene polymer but also enabling the applied lubricant to be readily removed by stripping the film of the thermoplastic resin from the oriented article. Even in the case where a tetrafluoroethylene polymer film is laminated on the tetrafluoroethylene polymer, the film can be readily stripped from the oriented article even after heating of the laminated tetrafluoroethylene polymer article at a temperature around the melting point of the tetrafluoroethylene polymer under pressure because the tetrafluoroethylene polymers do not adhere to each other. As the material of the other polymer resin film for laminating a preformed article of a tetrafluoroethylene polymer for the purpose of ensuring the plug flow of the tetrafluoroethylene polymer and for the purpose of the removal of the applied lubricant from the oriented article, there may be mentioned various resins, such as ultrahigh molecular weight polyethylene, poly(4-methylpentene-1) and polytetrafluoroethylene. The thickness of the film is not critical. However, the thickness is generally in the range of from about 10 to about 2000 μm, preferably from about 50 to about 1000 μm. In the case where the plug flow of the tetrafluoroethylene polymer is insufficient at the time of orienting a tetrafluoroethylene polymer, if a pressure is continuously applied onto the polymer for the purpose of orienting the polymer, melt fracture or brittle fracture tends to occur in the tetrafluoroethylene polymer. Moreover, when a tetrafluoroethylene polymer is oriented under conditions in which the plug flow of the polymer is difficult to be generated, the orientation of the resultant article becomes non-uniform and the article has portions where the mechanical strength is not sufficient. Such articles are especially unsuitable as a high-pressure sealant which is required to have a high compressive break resistance.

When a preformed article of a tetrafluoroethylene polymer is oriented between opposing dies having a sufficient amount of a lubricant applied to the inner surfaces thereof so that the friction between the preformed article and the inner surfaces of the dies is decreased, a multiaxially oriented shaped article which is uniformly oriented in all directions can be obtained.

Next, the method of producing the shaped article of the present invention will be explained in more detail with reference to FIGS. 1 to 3 and FIGS. 6 to 7.

Referring to FIG. 1, at least the inner surfaces 2 of opposing compression dies 1 are preheated to a temperature of from about room temperature to about 400° C. The preformed tetrafluoroethylene polymer sheet 3 which has been preheated to a temperature of 150° C. or more, preferably 170° to 340° C., more preferably 250° to 340° C., most preferably 300° to 327° C. as mentioned hereinbefore is placed between the preheated opposing compression dies 1. At this stage, it is preferred that a lubricant be applied to the internal surfaces 2 of the compression dies 3. When the difference between the temperature of the inner surfaces 2 of opposing compression dies 1 and the temperature of both surfaces of a preformed sheet 3 of a tetrafluoroethylene polymer is larger than about 50° C., measures as illustrated in FIG. 12 may be taken to prevent only the lower surface portion of the preformed sheet 3 from rapid cooling, as mentioned hereinbefore. The preformed tetrafluoroethylene polymer sheet 3 is compressed so that the plug flow of the polymer is produced, thereby attaining a desired orientation of the polymer. Then, the oriented polymer sheet 4 is cooled, in its compressed state, to about 100° C. or less, and the dies 1 are opened to take out the sheet article of the oriented tetrafluoroethylene polymer.

In manufacturing oriented tetrafluoroethylene polymer sheets having a small thickness or to manufacture a plurality of oriented tetrafluoroethylene polymer sheets by a single compressing operation in order to increase productivity, it is preferred that first a plurality of preformed tetrafluoroethylene polymer sheets 3 be piled up to obtain piled sheets 7, as illustrated in FIG. 2 (2-2-a), and then the piled sheets 7 be compressed between opposing dies. Further, from the viewpoint of facilitating removal of the lubricant stuck to the surfaces of the compressed tetrafluoroethylene polymer sheets after orientation operations, it is preferred that a preformed tetrafluoroethylene polymer sheet 3 [shown in FIG. 2(2-1-a)] or the piled sheets 7 [shown in FIG. 2(2-2-a)] be sandwiched between films 6 of the same tetrafluoroethylene polymer or another type of thermoplastic resin to obtain a sandwiched sheet or sandwiched piled sheets, as illustrated in FIG. 2 (2-1-b and 2-2-b), and then the sandwiched sheet or the sandwiched piled sheets may be compressed between opposing dies. When the compression of a preformed tetrafluoroethylene polymer has been effected in the manners as mentioned above, the sheets are separated from each other and/or from the films after completion of the orientation and cooling operations. The separation of a preformed tetrafluoroethylene polymer sheet even from another preformed tetrafluoroethylene polymer sheet or a film of the same tetrafluoroethylene polymer can be readily performed so long as the preformed tetrafluoroethylene polymer sheets are not heated to a temperature higher than the melting point of the tetrafluoroethylene polymer. On the other hand, separation of the oriented tetrafluoroethylene polymer sheet from a film of another thermoplastic resin can be generally performed without any difficulty so long as the temperature of the preformed article as heated does not exceed the melting point of the other thermoplastic resin, preferably not exceed the temperature corresponding to the melting point of the other thermoplastic resin minus 30° C. However, when there is employed a thermoplastic resin of which the viscosity does not decrease so much even at temperatures higher than the melting point of the resin as in the case of an ultrahigh molecular polyethylene, the temperature of the preformed article may be elevated to temperatures higher than the melting point of the resin without being accompanied by a problem of difficult separation of the article from the resin after the compression thereof. Compression and cooling of the preformed article may be effected using a compression press as illustrated in FIG. 3. Referring to FIG. 3, die plates 10 of the compression press have heating and cooling plates 11 (hereinafter referred to as "hot/cold die plates") attached hereto through heat insulators 13. The hot/cold die plates 11 are provided with through-holes 12 for passing a heating/cooling medium to control the temperature of the die plates 11. To the hot/cold die plates 11, 11 are respectively fixed opposing dies 1, 1 through insulators 18, 18. Prior to the compression of the tetrafluoroethylene polymer, the dies 1 are heated to a predetermined temperature which is generally in the range of from about room temperature to about 400° C. The preformed tetrafluoroethylene polymer sheet article 3 may be preheated to a temperature not lower than 150° C., preferably 170° to 340° C. It is preferred that a lubricant be applied to the inner surfaces 2 of the dies 1 in advance. The preformed tetrafluoroethylene polymer sheet article 3 is oriented by compression under pressure. In effecting the compression, the thickness of the resulting article is regulated by the use of a spacer 15 which determines the minimum distance between the upper and lower dies. By the use of an appropriate spacer, the compression of the preformed article is effected to a degree such that the average maximum expansion ratio of the article is at least about 2.4. The tetrafluoroethylene polymer sheet article in the compressed state is cooled to a temperature not higher than 100° C., and then the resultant oriented tetrafluoroethylene polymer sheet is taken out. In cooling, the cooling rate is controlled, for example, by varying the thickness of the insulators 18 and/or by regulating the temperature of the cooling medium passing through the hot/cold die plates 11. When the surfaces of dies 1 and hot/cold die plates 11 are curved for example in a circular arc form, the resultant shaped articles are curved in accordance therewith.

Figure 6:
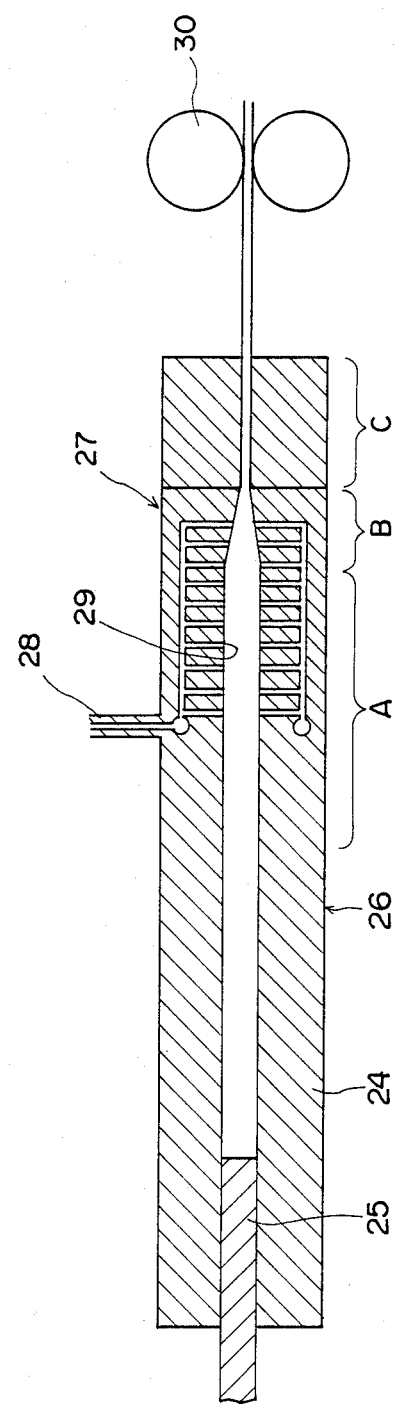
FIG. 6 shows a diagrammatic cross-sectional view illustrating another mode of orienting a preformed tetrafluoroethylene polymer by the use of a ram extruder.
Figure 7:
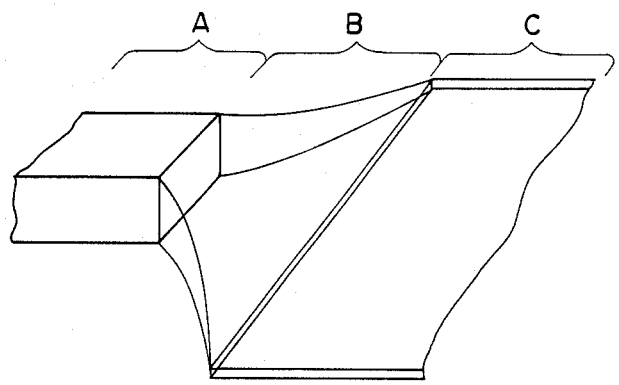
FIG. 7 shows a partial diagrammatic perspective view illustrating a dimensional change occurring at a part of the die of the ram extruder of FIG. 6 with respect to a tetrafluoroethylene polymer sheet in plug flow, which sheet is thus undergoing multiaxial orientation.

Orientation of a preformed article of a tetrafluoroethylene polymer may also be achieved by using an extruding machine as illustrated in FIG. 6. Referring to FIG. 6, a preformed tetrafluoroethylene polymer sheet or a plurality of preformed tetrafluoroethylene polymer sheets, one piled on the other, as illustrated in FIG. 2 are introduced into a ram extruder 26 comprising a heating cylinder 24 having a square inner cross-section and a square ram 25. The internal portion of the cylinder surrounded by the cylinder wall is hollow. Then, the preformed sheet or sheets are extruded through a die 27 consisting of regions A, B and C by means of the square ram 25 while heating. In the middle of the region A of the die 27, a device is provided for causing a lubricant to ooze so as to be present between the surfaces of the preformed tetrafluoroethylene polymer sheet and the die. The lubricant under high pressure is introduced through passage 28 and distributed to a plurality of lubricant-introducing ports 29, and oozes therefrom onto the surfaces of the tetrafluoroethylene polymer sheet so that the lubricant is caused to be present between the surfaces of the tetrafluoroethylene polymer sheet and the die. The lubricant-introducing ports 29 may be provided in the form of small slits or in the form of a hollow material such as a sintered metal having tiny communicating holes. In place of the use of the lubricant-introducing ports, the lubricant may be applied by spraying to the inner surfaces of the dies prior to starting extrusion molding. The tetrafluoroethylene polymer sheet or sheets having the lubricant uniformly applied to the surfaces thereof are extruded through the die 27 with the central portions of the polymer sheet moving at about the same speed as that of the surface portions of the sheet, i.e. in a plug flow fashion. Then, the sheet or sheets in plug flow are oriented at the region B of the die 27. The region B of the die 27 has such a structure that the thickness of the tetrafluoroethylene polymer sheet or sheets are gradually decreased. The dimensional change occurring in the region B of the die 27 with respect to the tetrafluoroethylene polymer sheet or sheets in plug flow, which are undergoing multiaxial orientation, is shown in FIG. 7. The tetrafluoroethylene polymer sheet or sheets while being in plug flow are extruded simultaneously in two directions, i.e. direction of flow and direction perpendicular thereto, so that the sheet or sheets are multiaxially oriented. The force of orienting the tetrafluoroethylene polymer sheet or sheets is attributed to the force of extrusion imparted by the ram extruder 26. The multiaxially oriented tetrafluoroethylene polymer sheet or sheets extruded are cooled at the region C of the die and are forced out of the die 27. The multiaxially oriented tetrafluoroethylene polymer sheet or sheets are rolled up by rolls 30. When the plurality of preformed sheets are extruded from the die 27, they are separated from each other to obtain a shaped article of an oriented tetrafluoroethylene polymer.

The thus obtained shaped article of an oriented tetrafluoroethylene polymer is subjected to a shrinking treatment to obtain the ultimate article of this invention. The shrinking treatment may comprise heating a shaped article of an oriented tetrafluoroethylene polymer at a temperature in the range of from 150° C. to the melting temperature of the polymer, preferably from 180° to 300° C. The period for which these temperatures are maintained may vary depending on the size of the shaped article, but is generally in the range of from 1 sec to 1000 hr, preferably from 1 min to 10 hr. The shrinking treatment may preferably be conducted without application of any pressure to the article. It should be noted that by this treatment the shaped article is caused to exhibit an average maximum expansion ratio which is lower than that of the untreated shaped article. For examle, by heating a shaped article of an oriented tetrafluoroethylene polymer at 220° C. for 2 hours, the average maximum expansion ratio of the article is caused to decrease from the original one, e.g. decrease from 4.63 to 3.31, from 4.03 to 3.11, from 3.41 to 2.71, or from 2.44 to 2.06. In the present invention, orientation of a preformed article and shrinking of the resultant article are conducted so as to enable the ultimate article to have an average maximum expansion ratio of from 2 to 10 and an orientation release stress at 200° C. of less than 5 Kg/cm$^2$ together with a specific gravity of at least 1.8, a least maximum shrinkage ratio of 0.71 or less and a shrinking starting temperature of at least 80° C. Conveniently, the above-mentioned shrinking treatment may be carried out by, after the orientation, taking out of the compression dies or ram extruder the oriented article having a temperature of from 150° C. to the melting temperature of the polymer, preferably from 180° C. to 300° C. and subsequently cooling the article as it is at room temperature without application of any pressure thereto so as to attain free shrinkage of the article. As a result, the shaped article having a specific gravity of at least 1.8, an average maximum expansion ratio of from 2 to 10, a least maximum shrinkage ratio of 0.71 or less, an orientation release stress at 200° C. of less than 5 Kg/cm$^2$ and a shrinking starting temperature of at least 80° C. is obtained. In the case of the extrusion molding using a ram extruder, it is preferred that the temperature of the region C of the die thereof be maintained at a temperature in the range of from 150° C. to the melting temperature of the tetrafluoroethylene polymer, preferably from 180° to 300° C. This enables the oriented polymer to have at the region C a temperature such that the polymer forced out of the die 27 can undergo free shrinkage, for example at room temperature, thereby giving a convenient method for manufacturing the shaped article according to the present invention. This process is advantageous as compared to the process in which the preformed article is molded between opposing dies, taken out of the dies and then subjected to the shrinking treatment as described hereinbefore.

The thus manufactured shaped article may further be subjected to machining such as blanking, cutting or the like to obtain an ultimate product such as gasket, packing, bearing pad, sliding pad or the like. Alternatively, the preformed article of a tetrafluoroethylene polymer may be oriented under pressure between opposing dies so that the preformed article is shaped into an ultimate product such as gasket, packing, bearing pad, sliding pad or the like, simultaneously with the orientation. In the present invention, an uniformly oriented shaped article in the form of a gasket, packing, bearing pad, sliding pad or the like can be obtained more readily by first producing a large oriented sheet and then machining the sheet into a desired shape than the method in which the shaping into an ultimate product is conducted simultaneously with orientation of the tetrafluoroethylene polymer.

The shaped article of the present invention comprised of a tetrafluoroethylene polymer with a number average molecular weight of at least about 10$^6$ and having a specific gravity of at least 1.8, an average maximum expansion ratio of from 2 to 10, a least maximum shrinkage ratio of 0.71 or less, an orientation release stress at 200° C. of less than 5 Kg/cm$^2$ and a shrinking starting temperature of at least 80° C. has excellent compression creep resistance, compression resistance, impact strength, dimensional stability, gas barrier property and tensile strength.

Why the tetrafluoroethylene polymer article of the present invention is improved with respect to compression creep resistant properties has not yet been elucidated, but the following presumption may be made. The molecules of the tetrafluoroethylene polymer article respectively have an ultrahigh molecular weight, relatively high rigidity and long molecular chains which are intricately entangled together. When the molecules are oriented to a great extent, the molecular chains between the points of entanglement reach a state of approximately uniform tension. Therefore, any external force applied to the oriented tetrafluoroethylene polymer article will be uniformly spread to each of the molecular chains and, hence, the phenomenon known as "free drainage" of the molecular chains at the points of the entanglement is unlikely to occur. This is presumably the reason for markedly improved compression creep resistant properties of the shaped article of the present invention.

From the specific gravities of a tetrafluoroethylene polymer article measured before and after the orientation thereof, it has been confirmed that in the process of orienting a preformed tetrafluoroethylene polymer article between opposing dies under pressure, no significant change occurs in the void volume. Therefore, it is presumed that the reason why the gas barrier properties of the oriented tetrafluoroethylene polymer article of the present invention are improved is not a change in the void volume but a morphological change due to the orientation of the polymer molecules.

Moreover, it is believed that the improvement in dimensional stability with respect to the present shaped article is due to the relaxation to a certain extent of the orientation at a portion of the article where molecular motion occurs, which relaxation is brought about by shrinking treatment. Also, it is believed that the improvement in impact strength with respect to the present shaped article is due to the relaxation of the orientation by the shrinking treatment, which relaxation leads to a formation of elastic portions in the shaped article.

The shaped tetrafluoroethylene polymer article of the present invention is particularly useful in the fields where not only the inherent properties of the tetrafluoroethylene polymer, namely, chemical resistance, corrosion resistance, low frictional properties, non-stickiness, electrical insulating properties and heat resistance are appreciated, but also improvement is required with respect to the compression creep resistance, compression resistance, impact strength, dimensional stability, gas barrier properties and tensile strength. For example, the shaped article of the present invention can be advantageously utilized as a sealant such as a gasket and a packing, a lining material, a bearing pad, a sliding pad, sliding parts such as a bushing, a bearing and a piston ring, and the like.

As described above, the shaped tetrafluoroethylene polymer article of the present invention has excellent compression creep resistant properties, especially at high temperatures, as compared to those of the conventional polytetrafluoroethylene articles. Therefore, the extreme temperature, extreme internal pressure in the case of a sealant and other extreme conditions up to which the present tetrafluoroethylene polymer article can be stably used are high with great advantages.

The shaped article of the present invention can be advantageously used as, for example, packings such as V packings, U packings, 0 rings, diagonal packings and square-shaped packings. These packings are useful as a gland seal or the like for stirrers, valves, pumps, or the like. Further, the shaped article of the present invention can be advantageously utilized without being reinforced, as different from the conventional shaped articles of polytetrafluoroethylene. The conventional polytetrafluoroethylene articles are generally reinforced with another material, thereby forming composite type articles, for example, jacketed gaskets, spiral wound gaskets, back-up ring, slipper seals or the like. The shaped article of the present invention can also be advantageously used as diaphragms and bellows in valves. The diaphragms and bellows according to the present invention are preferable to the conventional diaphragms and bellows because the latter have the drawback of being poor in mechanical strength. Still further, the shaped tetrafluoroethylene polymer article of the present invention is useful as balls used in check valves in liquid-transporting systems. The shaped tetrafluoroethylene polymer article of the present invention is also useful as ball valve seats in ball valves, gate valve seats in gate valves, valve disks, or the like. The shape and dimension of the present tetrafluoroethylene polymer article for use as the above-mentioned purposes may be easily designed in accordance with their actual application conditions. For example, for flat gaskets, the shaped article of the present invention is often used in the form of a sheet having a thickness of 0.2 mm to 5 mm, preferably 0.5 mm to 4 mm. In the application field of bearings, the conventional tetrafluoroethylene polymer articles are to be used only under light load and low sliding rate conditions, since they inevitably undergo large compression creep. By contrast, the oriented tetrafluoroethylene polymer articles of the present invention can be advantageously used even when a heavy load is imposed. Particularly, they are suitable for use as bearing pads and sliding pads for heavy constructions, such as bridges, outdoor tanks and plant frameworks, and they can enjoy high durability.

The oriented tetrafluoroethylene polymer article of the present invention which contains a filling material advantageously exhibits a further improved dimensional stability at high temperatures, further improved compression creep resistant properties, and further improved wear resistance.

DETAILED DESCRIPTION OF THE PREFERRED EMBODIMENTS

The present invention will now be described in more detail with reference to the following Examples that by no means limit the scope of the present invention.

In the following Examples and Comparative Examples, the properties of the polymers and the shaped articles were determined according to the following methods.

1. Average maximum expansion ratio, and Least maximum shrinkage ratio

The dimensions of a sample of the shaped article having been oriented (if it is large, e.g. 100 cm×100 cm×3 cm, it is cut into an appropriate size, e.g. 10 cm×10 cm×3 cm) are measured at room temperature, and recorded. Then, the shaped article is heated at 380° C. for 5 hours after the temperature of the central portion thereof has become 380° C. By this heating, shrinking occurs in a plurality of planes contiguously aligned in substantially parallel relationship within the shaped article and simultaneously expansion occurs in a direction perpendicular to the planes. The resultant shaped article is cooled until the temperature of the core portion thereof becomes room temperature. The dimensions of the cooled shaped article are measured, and are compared with the recorded values as mentioned above. Thus, the direction in which the degree of expansion is largest is found.

Subsequently, from another sample of the same shaped article, a test specimen in a sheet form of e.g. 110 mm in length, 110 mm in width and 10 mm in thickness is cut out in a manner such that the plane in the shaped article sample which plane is defined by the surface of the test specimen to be cut out is perpendicular to the previously determined direction in which the degree of expansion is largest.

In substantially the same manner as described hereinbefore, a circle is drawn on the test specimen; four lines are drawn at angular intervals of 45°, the thicknesses at the intersecting points are measured; the test specimen is heated at 380° C. for 5 hours; and expansion and shrinkage are measured.

Thus, by calculating, there are obtained an average maximum expansion ratio ($T_1/T_0$) and a least maximum shrinkage ratio ($OM_1/r$) (see FIGS. 4 and 5).

2. Number average molecular weight

The number average molecular weight of a tetrafluoroethylene polymer is determined as follows. First, a specimen is blanked from a tetrafluoroethylene polymer or an article of a tetrafluoroethylene polymer. Second, the specimen is subjected to heat treatment under heating conditions as prescribed in ASTM D-1457. Third, the specific gravity of the thus heated specimen is measured, which is defined as the standard specific gravity (SSG) of the polymer. Finally, the number average molecular weight of the polymer is calculated from the SSG in accordance with the formula [R. D. Doban et al: Meeting of the Am. Chem. Soc., Atlantic City (1956)]:

$$SSG = -0.0579 \log \overline{Mn} + 2.6113$$

in which $\overline{Mn}$ represents a number average molecular weight of the polymer.

With respect to the above formula, reference may be made to page 16 of Satokawa et al "Fusso Jushi (Fluoro Resins)" published by the Nikkan Kogyo Shimbun Ltd., Tokyo, Japan, in April, 1976.

3. Compression set (%)

Figure 8:
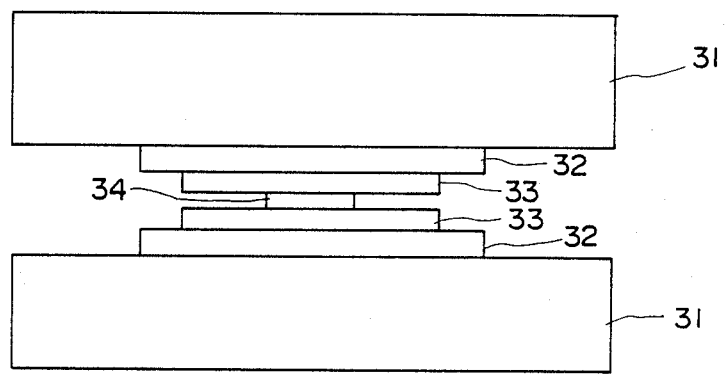
FIG. 8 shows a diagrammatic explanatory view illustrating an apparatus for measuring the compression set of a shaped article of a tetrafluoroethylene polymer.

Referring to FIG. 8, a test piece 34 blanked from an oriented tetrafluoroethylene polymer sheet article or a comparative sheet article in substantially the same manner as mentioned in item 1 above, which test piece is 50 mm in length, 50 mm in width and 2 to 3 mm in thickness, is sandwiched between smooth tempered glass plates 33 of each 160 mm in length, 160 mm in width, and 5 mm in thickness. In advance, both surfaces of the tempered glass plates and those of the test piece are cleaned using acetone or ethanol. The test piece 34 sandwiched between the reinforced glass plates 33 is further sandwiched between the mirror surfaces of polished stainless steel plates 32 (surface roughness according to Japanese Industrial Standard B 0601: 0.1 S-0.6 S) of 220 mm in length, 220 mm in width and 6 mm in thickness to form an assembly. The assembly is placed between hot press plates 31 of 400 mm in length, 400 mm in width and 60 mm in thickness preheated at 200° C. Then, a compressive force corresponding to a load of 500 Kg/cm$^2$ on the test piece 34 is applied to the assembly. In this instance, the area of the test piece 34 slightly increases due to the deformation thereof by compression, but the loading with the above-mentioned compressive force is continued at a temperature of 200° C. for 1 hour. Then, the heater for the hot press plates 31 is switched off, and water is circulated through the hot press plates so as to cool the test piece to room temperature within about 30 minutes. The compressive force is maintained during the cooling. Thereafter, the test piece is taken out.

The thickness ($t_0$) of the test piece before compression and thickness ($t_1$) of the same after compression are measured at 5 points of the test piece using a micrometer (Japanese Industrial Standard B 7503, Class 1). The compression set at each point is calculated by the formula:

$$\frac{(t_0 - t_1)}{t_0} \times 100.$$

The compression set as used herein is an arithmetic mean of the thus obtained values of compression set. The above procedures are essentially in accordance with ASTM D 621.

4. Orientation release stress (Kg/cm$^2$)

Figure 9:
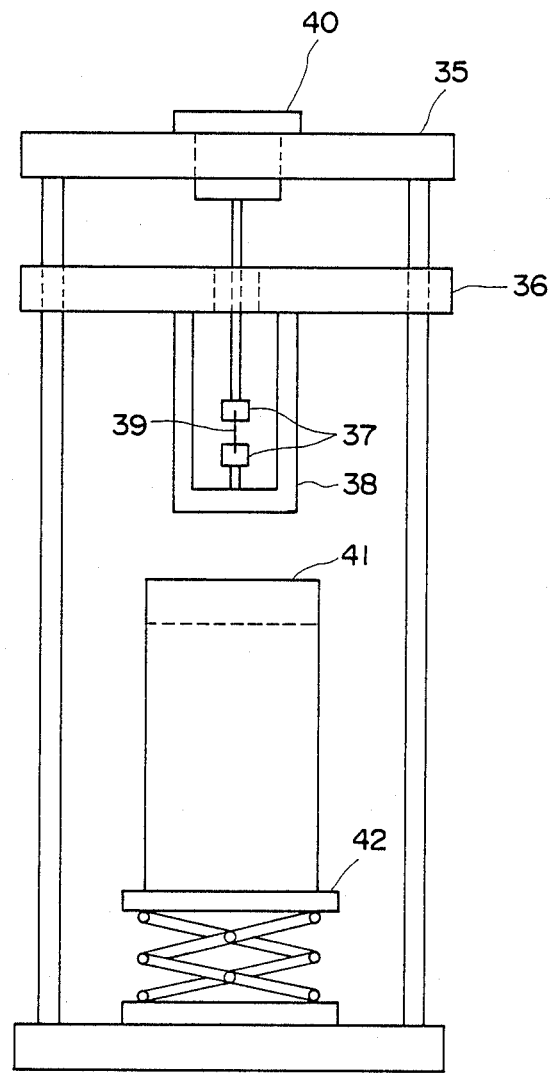
FIG. 9 shows a diagrammatic side view illustrating an apparatus for measuring the orientation release stress of a shaped article of a tetrafluoroethylene polymer.

The orientation release stress is measured in accordance with ASTM D 1504. FIG. 9 illustrates a measuring apparatus which has been prepared by modifying a customary tensile tester. The apparatus has a load cell 40 attached to the top of a frame 35 to sense the shrinking force of a test piece 39 which is secured by means of clamping jaws 37. The lower clamping jaws are fixed to a support 38 which extends from a cross head 36. The test piece 39 is heated by means of an oil bath 41, which can be lifted or descended by means of a lifter 42.

The test piece 39 is in the form of a strip having a length of 80 mm and a width of 10 mm (thickness is not limited) which is blanked from a shaped article of a tetrafluoroethylene polymer in substantially the same manner as mentioned in item 1 above. Four test pieces are prepared by cutting out along four directions on the surface of the article, any neighboring two directions of which have an included angle of 45°. Each test piece 39 is secured by means of the upper and lower clamping jaws 37. The distance between the upper clamping jaws and the lower clamping jaws is set at 50 mm. Then, the oil bath 41 heated to 200° C. is lifted until the uppermost portion of the upper clamping jaws is immersed in the oil. The shrinking force of the test piece is sensed by the load cell 40, and recorded on a recorder (not shown). The shrinking force recorded on the recorder reaches a constant value about 5 minutes after the immersion of the test piece in the oil bath. The constant value is divided by the value of the cross-sectional area (thickness × width) of the test piece to convert it into a value of stress (Kg/cm$^2$). The orientation release stress as used herein is an arithmetic mean of the stress values determined with respect to the four test pieces as described above.

5. Specific gravity

The measurement of the specific gravity is carried out in accordance with ASTM D 792.

6. Moisture permeability (g/cm$^2$·24 hr)

The moisture permeability of a tetrafluoroethylene polymer article is measured at 38° C. at a relative humidity of 90%, using a test specimen in a film form prepared in substantially the same manner as mentioned in item 1 above, in accordance with ASTM F 372.

7. Oxygen permeability (ml/m$^2$·day·atm)

The oxygen permeability of a tetrafluoroethylene polymer article is measured at 30° C., using a test specimen in a film form prepared in substantially the same manner as mentioned in item 1 above, in accordance with ASTM D 1434.

8. Shrinking starting temperature

A test piece having a width of 3 mm, a length of 20 to 30 mm and a thickness of 0.2 mm is blanked using a microtome from a shaped article of a tetrafluoroethylene polymer by the method as described in item 1 above. The dimensional change of the test piece at elevated temperatures is measured by means of a measuring apparatus for Thermomechanical Analysis (model TMA-10 manufactured and sold by Seiko Instruments Inc., Japan) under the following conditions:

(a) temperature range: 30° C. to 300° C.;
(b) temperature elevation rate: 5° C./min;
(c) tensile stress applied to the test piece: 5 g/mm$^2$; and
(d) distance between chucks: 10 mm.

Figure 10:
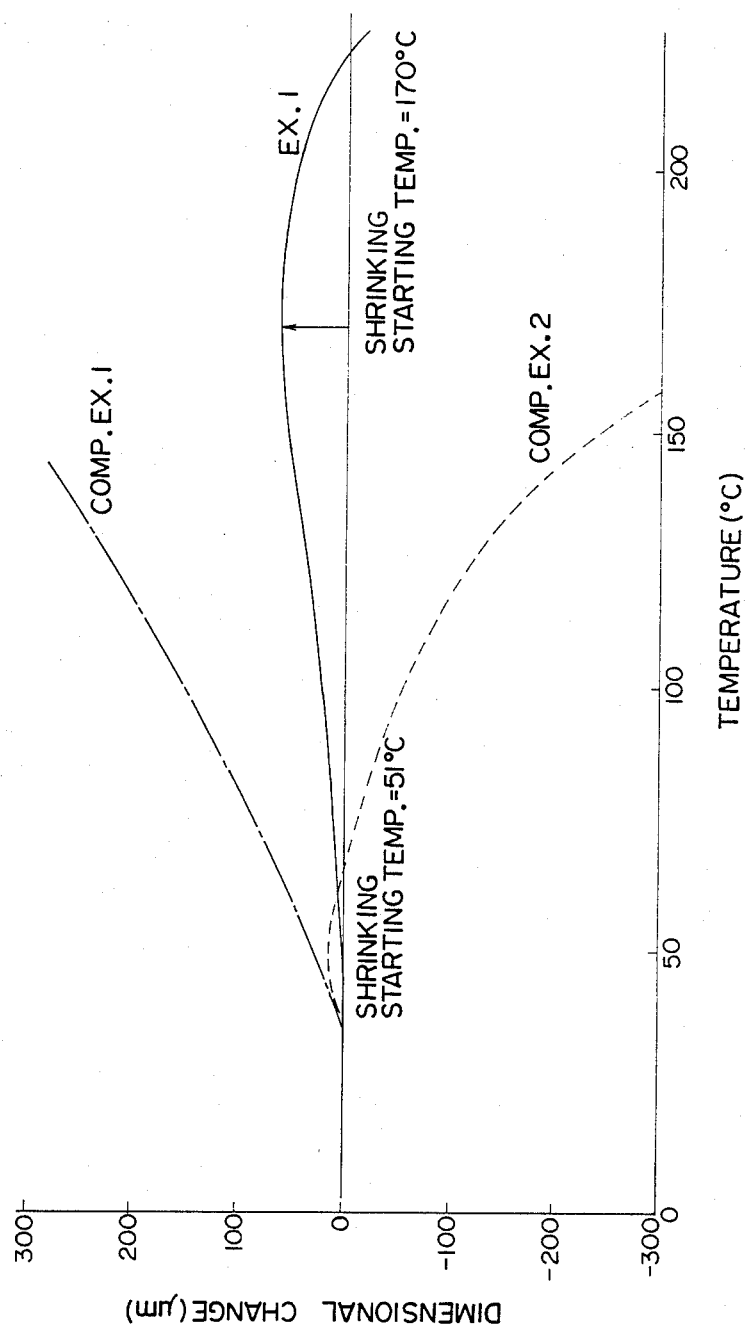
FIG. 10 is a graph showing the relationship between the dimensional change and the heating temperature, which is obtained by thermomechanical analysis with respect to the shaped article obtained in Example 1 as will be described later, shown in comparison with those of the shaped articles obtained in Comparative Examples 1 and 2 as will be described later, in which graph shrinking starting temperatures as will be defined later are indicated.

The test piece is set between chucks at room temperature, and the dimensional change of the test piece is measured. In the measurement, the ambient temperature thereof is elevated up to 300° C. at a rate of 5° C./min. The dimensional changes are plotted against the temperatures, as shown in FIG. 10. In the graph of FIG. 10, the positive ratio of the dimensional change indicates expansion of the test piece, while the negative ratio indicates shrinkage of the test piece.

As shown in FIG. 10, the test piece expands with the increase of temperature until it is heated to a certain temperature, but at the certain temperature, it stops expansion and above the certain temperature, it shrinks. The certain temperature at which the expansion of the test piece turns to the shrinkage thereof is defined as the shrinkage starting temperature in the present invention.

When a test piece is set and heated in the same manner as described above, there is a case that the test piece shrinks continuously without expansion. In this case, the shrinking starting temperature of the test piece is 30° C. or less. The test piece blanked from a non-oriented tetrafluoroethylene polymer article only expands without shrinking in the temperature range of from 30° C. to 300° C.

9. Degree of dimensional change

Figure 11:
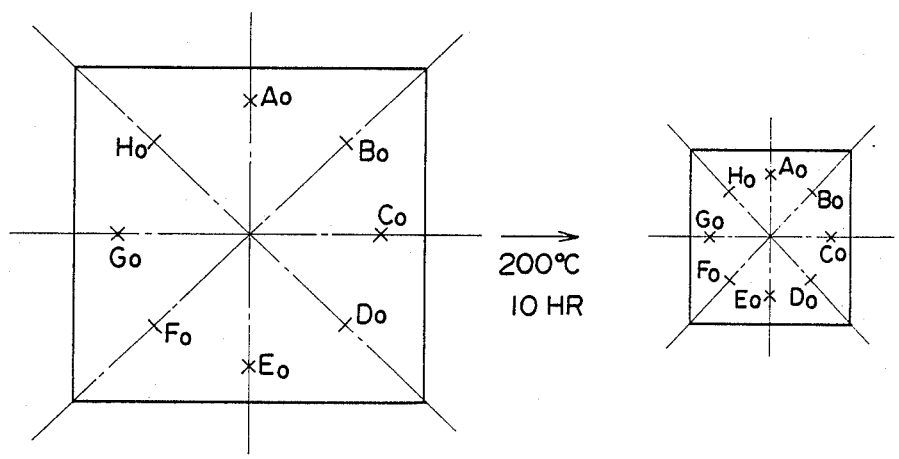
FIG. 11 shows diagrammatic explanatory views illustrating how the dimensional change is measured with respect to a shaped article of a tetrafluoroethylene polymer.

As illustrated in the left-hand view of FIG. 11, the surface of a shaped article of a tetrafluoroethylene polymer is marked with points $A_0, B_0, \ldots H_0$. The distance between $A_0$ and $E_0$, i.e. $\overline{A_0E_0}$, is denoted as $L_1$. Similarly, the distances $\overline{B_0F_0}$, $\overline{C_0G_0}$ and $\overline{D_0H_0}$ are denoted as $L_2$, $L_3$ and $L_4$, respectively. Then, the shaped article is heated in an oven of internal air circulation type at a temperature of 200° C. for 10 hours. Then, the article is taken out of the oven, and allowed to cool to room temperature. Referring to the right-hand view of FIG. 11, the distance between $A_0$ and $E_0$, i.e. $\overline{A_0E_0}$, which is measured after the above-mentioned heat treatment, is denoted as $l_1$. Similarly, the distance $\overline{B_0F_0}$, $\overline{C_0G_0}$ and $\overline{D_0H_0}$ are denoted as $l_2$, $l_3$ and $l_4$, respectively. The degree of dimensional change is defined by the following formula:

$$a_n(\%) = \frac{l_n - L_n}{L_n} \times 100,$$

wherein n is an integer of 1 to 4.

The terminology "degree of dimensional change" as used herein is the arithmetic mean ($\alpha$) of $\alpha_n$s (n=1 to 4) as follows:

$$\alpha(\%) = \frac{\alpha_1 + \alpha_2 + \alpha_3 + \alpha_4}{4}$$

Further, the value (R) defined by the following formula is calculated:

$$R = \alpha_{max} - \alpha_{min}$$

wherein $\alpha_{max}$ represents the maximum of $\alpha_n$s and $\alpha_{min}$ represents the minimum of $\alpha_n$s.

10. Izod impact strength

A test piece is blanked from a shaped article of a tetrafluoroethylene polymer by the method as described in item 1 above. The Izod impact strength of the test piece is measured at 23° C. and −196° C. in accordance with ASTM D 256.

EXAMPLE 1 AND COMPARATIVE EXAMPLES 1 to 4

A preformed polytetrafluoroethylene sheet having a thickness of 14 mm as manufactured according to the Free Baking method [Valflon (registered trade mark) No. 7000 manufactured and sold by Nippon Valqua Industry Ltd., Japan which has a specific gravity of 2.16 and a number average molecular weight of about $1 \times 10^7$] (Comparative Example 1) was preheated at temperatures as indicated in Table 1, compressed using a compression press as illustrated in FIG. 3 provided with opposing dies having a temperature as indicated in Table 1. With respect to the Free Baking method, reference may be made to pages 58 to 65 of Satokawa et al "Fusso Jushi (Fluoro resins)" published by the Nikkan Kogyo Shimbun, Ltd., Japan in April, 1976. Before compressing the preformed sheet, the inner surfaces of the opposing dies had been lubricated by means of a silicone oil (KF 965 manufactured and sold by Shinetsu Silicone K.K., Japan, which has a viscosity of about 10,000 cps at 25° C.). In compressing the preformed sheet, a 0.1 mm thick film of polytetrafluoroethylene was disposed between the upper surface of the preformed sheet and the inner surface of the upper die and between the lower surface of the preformed sheet and the inner surface of the lower die. The hot/cold die plate 11 of the compression press was set at room temperature. Thus, there was obtained an oriented polytetrafluoroethylene sheet article (Comparative Example 2) having an average maximum expansion ratio (D) of 4.6 as indicated in Table 1. The thickness of the oriented polytetrafluoroethylene sheet article was about 3 mm. The oriented polytetrafluoroethylene sheet was subjected to heat treatment for free shrinkage at 220° C. for 2 hours, thereby obtaining a shaped article of a tetrafluoroethylene polymer according to the present invention (Example 1).

Next, substantially the same procedures as described above were repeated twice except that the temperatures for free shrinkage were 80° C. and 150° C., as indicated in Table 1, thereby obtaining Comparative Samples (Comparative Example 3 and Comparative Example 4). The orientation conditions and the test results with respect to the properties of the above-obtained samples are shown in Table 1. The dimensional changes in a thermomechanical analysis of Samples of Example 1 and Comparative Examples 1 and 2, are plotted against temperature in FIG. 10.

From the foregoing results, it is apparent that the shaped article of the present invention has excellent compression creep resistant properties, dimensional stability, and Izod impact strength.

TABLE 1

| Sample | Temp. (°C.) for orientation Preform* | Temp. (°C.) for orientation Dies 1 | Temp. (°C.) for free shrinkage | Average maximum expansion ratio (D) | Least maximum shrinkage ratio | ORS** (kg/cm²) | Shrinking starting temp. (°C.) in TMA*** | Compression set (%) | Degree of dimensional change (%) Average | Degree of dimensional change (%) R | Izod impact strength (notched, kg · cm/cm) 23° C. | Izod impact strength (notched, kg · cm/cm) −196° C. | Specific gravity (g/cm³) |
|---|---|---|---|---|---|---|---|---|---|---|---|---|---|
| Example 1 | 260 | 260 | 220 | 3.3 | 0.56 | 0 | 170 | 34 | 0 | 0 | 33 | 19 | 2.14 |
| Comparative Example 1 | no orientation | | no free shrinkage | 1 | 1.00 | 0 | no shrinkage | 70 | 0 | 0 | 12 | 6 | 2.16 |
| 2 | 260 | 260 | no free shrinkage | 4.6 | 0.48 | 22 | 49 | 14 | −12.5 | 0.4 | 25 | 12 | 2.16 |
| 3 | 260 | 260 | 80 | 4.4 | 0.48 | 15 | 65 | 17 | −8.6 | 0.3 | 26 | — | 2.15 |
| 4 | 260 | 260 | 150 | 3.8 | 0.53 | 7 | 117 | 27 | −4.1 | 0.2 | 26 | — | 2.15 |

*Preform: Preformed Article
**ORS: Orientation Release Stress
***TMA: Thermomechanical Analysis

EXAMPLES 2 TO 4 AND COMPARATIVE EXAMPLES 5 AND 6

Substantially the same procedures as described in Comparative Example 2 were repeated except that a preformed polytetrafluoroethylene sheet having a thickness of 12 mm was used, thereby obtaining an oriented polytetrafluoroethylene sheet article having an average maximum expansion ratio of 4.1 as indicated in Table 2 (Comparative Example 5).

Pieces blanked from the thus obtained sheet article were separately subjected to heat treatment for free shrinkage at 150° C., 220° C. and 300° C. for 2 hours, thereby obtaining three shaped articles of an oriented tetrafluoroethylene polymer according to the present invention (Examples 2, 3 and 4). Further, free shrinkage was conducted at 80° C., thereby obtaining a comparative sample (Comparative Example 6).

EXAMPLES 5 TO 8 AND COMPARATIVE EXAMPLES 7 TO 10

Substantially the same procedures as described in Comparative Example 2 were repeated twice, thereby obtaining two oriented polytetrafluoroethylene sheet articles having average maximum expansion ratios of 3.4 (Comparative Example 7) and 2.4 (Comparative Example 9). Pieces from the thus obtained sheet articles were separately subjected to heat treatment for free shrinkage at 80° C., 150° C. and 220° C. for 2 hours, thereby obtaining samples (Comparative Example 8 and Examples 5 and 6).

Moreover, from the sample of Comparative Example 9, there were obtained oriented sheets (Comparative Example 10 and Examples 7-8).

ent invention which were subjected to the heat treatment for free shrinkage were remarkably improved with respect to impact resistance, as compared to the non-oriented polytetrafluoroethylene sheets and the oriented polytetrafluoroethylene sheets which were not subjected to heat treatment for free shrinkage.

TABLE 2

| Sample | | Temp. (°C.) for orientation | | Temp. (°C.) for free shrinkage | Average maximum expansion ratio | Least maximum shrinkage ratio | ORS* (kg/cm$^2$) | Shrinkage starting temp. (°C.) in TMA* | Compression set (%) | Degree of dimensional change (%) | | Izod impact strength (notched, kg · cm/cm) 23° C. | specific gravity (g/cm$^3$) |
|---|---|---|---|---|---|---|---|---|---|---|---|---|---|
| | | Preform* | Dies 1 | | | | | | | Average | R | | |
| Example | 2 | 260 | 260 | 150 | 3.6 | 0.53 | 4.8 | 125 | 28 | −2.7 | 0.1 | 25 | 2.15 |
| | 3 | 260 | 260 | 220 | 3.1 | 0.59 | 0 | 184 | 37 | 0 | 0 | 28 | 2.15 |
| | 4 | 260 | 260 | 300 | 2.1 | 0.71 | 0 | 260 | 52 | 0 | 0 | 37 | 2.16 |
| Comparative Example | 5 | 260 | 260 | no free shrinkage | 4.1 | 0.50 | 18 | 51 | 25 | −11.0 | 0.3 | 22 | 2.15 |
| Example | 6 | 260 | 260 | 80 | 3.8 | 0.53 | 14 | 87 | 26 | −7.8 | 0.2 | 23 | 2.16 |
| Example | 5 | 260 | 260 | 150 | 2.9 | 0.59 | 4.8 | 90 | 39 | −2.7 | 0.1 | 21 | 2.15 |
| | 6 | 260 | 260 | 220 | 2.7 | 0.63 | 0 | 157 | 43 | 0 | 0 | 22 | 2.16 |
| Comparative | 7 | 260 | 260 | no free shrinkage | 3.4 | 0.56 | 14 | 66 | 33 | −8.2 | 0.2 | 19 | 2.15 |
| Example | 8 | 260 | 260 | 80 | 3.3 | 0.56 | 12 | 60 | 34 | −6.7 | 0.2 | 20 | 2.16 |
| Example | 7 | 260 | 260 | 150 | 2.2 | 0.67 | 3.3 | 138 | 51 | −1.9 | 0 | 19 | 2.15 |
| | 8 | 260 | 260 | 220 | 2.1 | 0.71 | 0 | 198 | 53 | 0 | 0 | 20 | 2.15 |
| Comparative | 9 | 260 | 260 | no free shrinkage | 2.4 | 0.67 | 9 | 109 | 48 | −5.3 | 0.2 | 18 | 2.16 |
| Example | 10 | 260 | 260 | 80 | 2.3 | 0.67 | 7 | 110 | 50 | −4.3 | 0.1 | 18 | 2.16 |
| Example | 9 | 260 | 260 | 300 | 3.1 | 0.59 | 0 | 250 | 38 | 0 | 0 | 60 | 2.16 |
| Comparative Example | 11 | 260 | 260 | no free shrinkage | 5.7 | 0.43 | 28 | 46 | 4 | −15.1 | 0.5 | 30 | 2.15 |

*Preform, ORS and TMA are as mentioned in Table 1.

EXAMPLE 9 AND COMPARATIVE EXAMPLE 11

Substantially the same procedures as described in Comparative Example 2 were repeated, thereby obtaining an an oriented polytetrafluoroethylene sheet article having an average maximum expansion ratio of 5.7 (Comparative Example 11).

Then, substantially the same procedures as described in Comparative Example 2 were repeated, thereby obtaining an oriented polytetrafluoroethylene sheet article having an average maximum expansion ratio of 5.7, which was the same as that of the Sample of Comparative Example 11. A piece from the thus obtained sheet article was subjected to heat treatment for free shrinkage at 300° C. for 2 hours, thereby obtaining an oriented sheet (Example 9).

The orientation conditions and the test results with respect to the properties of Samples of Examples 2 to 9 and Comparative Examples 5 to 11 are shown in Table 2. From Table 2, it is apparent that the shaped article of the present invention has excellent compression creep resistant properties, dimensional stability, and Izod impact strength.

Figure 13:
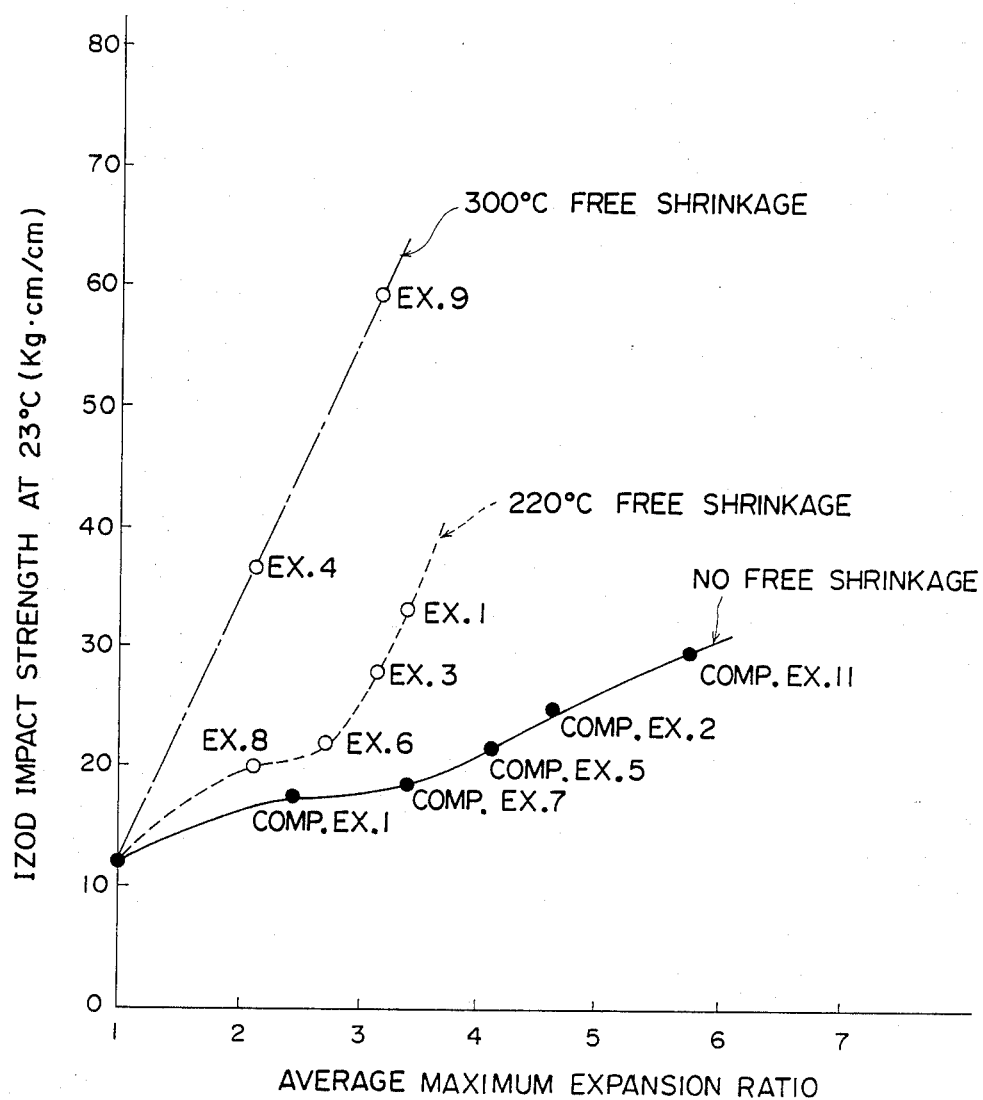
FIG. 13 is a graph showing the relationship between the Izod impact strength and the average maximum expansion ratio with respect to the shaped articles obtained in Examples 1, 3, 6 and 8 as will be described later in which free shrinkage was effected at 220° C. and in Examples 4 and 9 as will be described later in which free shrinkage was effected at 300° C., shown in comparison with that of the shaped articles obtained in Comparative Examples 1, 2, 5, 7 and 11 as will be described later in which no free shrinkage was effected.

With respect to all of the Samples and Comparative Samples obtained above, the Izod impact strength values at 23° C. have been plotted against the average maximum expansion ratio values in FIG. 13. From the graph of FIG. 13, it is apparent that the shaped articles of an oriented tetrafluoroethylene polymer of the present invention which were subjected to the heat treatment for free shrinkage were remarkably improved with respect to impact resistance, as compared to the non-oriented polytetrafluoroethylene sheets and the oriented polytetrafluoroethylene sheets which were not subjected to heat treatment for free shrinkage.

EXAMPLES 10 TO 13 AND COMPARATIVE EXAMPLES 12 TO 19

Substantially the same procedures as described in Examples 1 to 9 and Comparative Examples 1 to 11 were repeated three times except that the temperature for orientation was changed to 300° C., thereby obtaining an oriented sheet having an average maximum expansion ratio of 5.1 (Comparative Example 12), an oriented sheet having an average maximum expansion ratio of 4.2 (Comparative Example 15), and an oriented sheet having an average maximum expansion ratio of 3.1 (Comparative Example 18). Subsequently, these oriented sheets were subjected to free shrinking treatment at a temperature selected from 80° C., 150° C. and 220° C. for 2 hours, thereby obtaining sheets (Comparative Examples 13 and 14 and Example 10) from the sheet of Comparative Example 12, sheets (Comparative Examples 16 and 17 and Example 11) from the sheet of Comparative Example 15, and sheets (Comparative Example 19 and Examples 12 and 13) from the sheet of Comparative Example 18. The orientation conditions and the test results with respect to the properties of Samples of Examples 10 to 13 and and Comparative Examples 12 to 19 are shown in Table 3. From Table 3, it is apparent that the shaped article of a tetrafluoroethylene polymer of the present invention has excellent compression creep resistant properties and dimensional stability.

TABLE 3

| Sample | | Temp. (°C.) for orientation | | Temp. (°C.) for free shrinkage | Average maximum expansion ratio | Least maximum shrinkage ratio | ORS* (kg/cm$^2$) | Shrinkage starting temp. (°C.) in TMA* | Compression set (%) | Degree of dimensional change (%) | | Specific gravity (g/cm$^3$) |
|---|---|---|---|---|---|---|---|---|---|---|---|---|
| | | Preform* | Dies 1 | | | | | | | Average | R | |
| Example | 10 | 300 | 300 | 220 | 3.7 | 0.53 | 0 | 170 | 27 | 0 | 0 | 2.15 |
| Comparative | 12 | 300 | 300 | no free | 5.1 | 0.45 | 16 | 51 | 5 | −9.4 | 0.4 | 2.14 |

TABLE 3-continued

| Sample | | Temp. (°C.) for orientation | | Temp. (°C.) for free shrinkage | Average maximum expansion ratio | Least maximum shrinkage ratio | ORS* (kg/ cm$^2$) | Shrinkage starting temp. (°C.) in TMA* | Compression set (%) | Degree of dimensional change (%) | | Specific gravity (g/cm$^3$) |
|---|---|---|---|---|---|---|---|---|---|---|---|---|
| | | Preform* | Dies 1 | | | | | | | Average | R | |
| tive Example | 13 | 300 | 300 | shrinkage 80 | 4.7 | 0.48 | 15 | 72 | 11 | −8.3 | 0.3 | 2.15 |
| | 14 | 300 | 300 | 150 | 4.3 | 0.50 | 5.9 | 113 | 18 | −3.4 | 0.1 | 2.16 |
| Example | 11 | 300 | 300 | 220 | 3.5 | 0.56 | 0 | 180 | 30 | 0 | 0 | 2.15 |
| Comparative Example | 15 | 300 | 300 | no free shrinkage | 4.2 | 0.50 | 16 | 72 | 20 | −9.3 | 0.4 | 2.15 |
| | 16 | 300 | 300 | 80 | 3.9 | 0.53 | 12 | 84 | 24 | −6.9 | 0.2 | 2.16 |
| | 17 | 300 | 300 | 150 | 3.7 | 0.53 | 5.8 | 123 | 28 | −3.3 | 0.2 | 2.16 |
| Example | 12 | 300 | 300 | 150 | 3.0 | 0.59 | 2.6 | 140 | 38 | −1.5 | 0 | 2.15 |
| | 13 | 300 | 300 | 220 | 2.7 | 0.63 | 0 | 176 | 43 | 0 | 0 | 2.16 |
| Comparative Example | 18 | 300 | 300 | no free shrinkage | 3.1 | 0.59 | 7.6 | 97 | 37 | −4.3 | 0.2 | 2.16 |
| | 19 | 300 | 300 | 80 | 3.0 | 0.59 | 6.2 | 102 | 38 | −3.5 | 0.2 | 2.15 |

*Preform, ORS and TMA are as mentioned in Table 1.

EXAMPLE 14

A preformed polytetrafluoroethylene sheet having a thickness of 12 mm as manufactured according to the Free Baking method [Valflon (registered trade mark) No. 7000 manufactured and sold by Nippon Valqua Industry Ltd., Japan which has a specific gravity of 2.16 and a number average molecular weight of about $1 \times 10^7$] was preheated at 220° C., and compressed using a compression press as illustrated in FIG. 3 provided with opposing dies having a temperature of 220° C. Then, the compressed sheet having a temperature of 220° C. was taken out of the dies, and allowed to stand for free shrinkage until the temperature of the article was cooled to room temperature. Thus, there was obtained an oriented polytetrafluoroethylene sheet article having an average maximum expansion ratio of 3.8 and a thickness of 3.1 mm. The orientation conditions and the test results are shown in Table 4. From Table 4, it is apparent that the shaped article of the present invention as obtained above has excellent dimensional stability and impact strength, with excellent creep resistant properties maintained.

EXAMPLE 15

A preformed polytetrafluoroethylene sheet having a thickness of 15 mm as manufactured according to the Free Baking method [Valflon (registered trade mark) No. 7000 manufactured and sold by Nippon Valqua Industry Ltd., Japan which has a specific gravity of 2.16 and a number average molecular weight of about $1 \times 10^7$] was preheated at 260° C., and compressed using a compression press as illustrated in FIG. 3 provided with opposing dies having a temperature of 260° C. Then, hot/cool die plates 11 were cooled to 220° C., and the sheet having a temperature of 220° C. was taken out of the the opposing dies and allowed to stand for free shrinkage, until the temperature of the article was cooled to room temperature. Thus, there was obtained an oriented polytetrafluoroethylene sheet article having an average maximum expansion ratio of 5.8 and a thickness of 2.6 mm. The orientation conditions and the test results are shown in Table 5. From Table 5, it is apparent that the shaped article of the present invention as obtained above has excellent dimensional stability and impact strength with excellent compression creep resistant properties maintained.

TABLE 5

| Sample | | Temp. (°C.) for orientation | | Takeout temp. (°C.) of article | Average maximum expansion ratio (D) | Least maximum shrinkage ratio | ORS* (kg/ cm$^2$) | Shrinking starting temp. (°C.) in TMA* | Compression set (%) | Degree of dimensional change (%) | | Izod impact strength (notched, kg · cm/cm) 23° C. | Specific gravity (g/cm$^3$) |
|---|---|---|---|---|---|---|---|---|---|---|---|---|---|
| | | preform* | Dies 1 | | | | | | | Average | R | | |
| Example | 15 | 260 | 260 | 220 | 5.8 | 0.42 | 0 | 172 | 7 | 0 | 0 | 43 | 2.15 |

*Preform, ORS and TMA are as mentioned in Table 1.

EXAMPLE 16 AND COMPARATIVE EXAMPLES 20 AND 21

Thirty preformed polytetrafluoroethylene sheets each having a thickness of 0.33 mm [Valflon (registered trade mark) cut tape No. 7900 manufactured and sold by Nippon Valqua Industry Ltd., Japan] were piled up.

TABLE 4

| Sample | | Temp. (°C.) for orientation | | Takeout temp. (°C.) of article | Average maximum expansion ratio (D) | Least maximum shrinkage ratio | ORS* (kg/ cm$^2$) | Shrinking starting temp. (°C.) in TMA* | Compression set (%) | Degree of dimensional change (%) | | Izod impact strength (notched, kg · cm/cm) 23° C. | Specific gravity (g/cm$^3$) |
|---|---|---|---|---|---|---|---|---|---|---|---|---|---|
| | | preform* | Dies 1 | | | | | | | Average | R | | |
| Example | 14 | 220 | 220 | 220 | 3.8 | 0.53 | 0 | 180 | 39 | 0 | 0 | 35 | 2.16 |

*Preform, ORS and TMA are as mentioned in Table 1.

The piled sheets were multiaxially oriented in substantially the same manner as in Example 1 so as to have an average maximum expansion ratio of about 5, followed by heat treatment for free shrinkage at 220° C., thereby obtaining an oriented sheet having an average maximum expansion ratio of 3.3 and a thickness of 0.1 mm (Example 16).

Substantially the same procedures as described above were repeated except that the above-mentioned heat treatment for free shrinkage was not conducted, thereby obtaining an oriented sheet having an average maximum expansion ratio of 3.3 and thickness of 0.1 mm (Comparative Example 20). A preformed polytetrafluoroethylene sheet having a thickness of 0.1 mm [Valflon (registered trade mark) sheet No. 7900; manufactured and sold by Nippon Valqua Industry Ltd., Japan] without orientation was employed as a control (Comparative Example 21).

The orientation conditions and the test results with respect to the properties of Samples of Example 16 and Comparative Examples 20 and 21 are shown in Table 6. As is apparent from the water permeability and oxygen permeability data in Table 6, the shaped article of an oriented tetrafluoroethylene polymer of the present invention which was subjected to the heat treatment for free shrinkage has excellent anti-blistering properties, as compared with those of the non-oriented polytetrafluoroethylene sheet.

material has excellent dimensional stability, with excellent compression creep resistant properties maintained.

TABLE 7

| Sample | Temp. (°C.) for orientation Preform* | Temp. (°C.) for orientation Dies 1 | Temp. (°C.) for free shrinkage | Average maximum expansion ratio (D) | Least maximum shrinkage ratio | ORS* (kg/cm²) | Shrinking starting temp. (°C.) in TMA* | Compression set (%) | Degree of dimensional change (%) Average | Degree of dimensional change (%) R | Specific gravity (g/cm³) |
|---|---|---|---|---|---|---|---|---|---|---|---|
| Example 17 | 260 | 260 | 220 | 3.9 | 0.53 | 0 | 190 | 39 | 0 | 0 | 2.24 |
| Comparative Example 22 | 260 | 260 | no free shrinkage | 3.9 | 0.53 | 15 | 60 | 38 | −7.5 | 0.3 | 2.24 |
| Comparative Example 23 | no orientation | | no free shrinkage | 1 | 1.0 | 0 | no shrinkage | 62 | 0 | 0 | 2.24 |

*Preform, ORS and TMA are as mentioned in Table 1.

EXAMPLE 18 AND COMPARATIVE EXAMPLES 24 TO 30

Preformed polytetrafluoroethylene sheets having varied thicknesses as manufactured according to the Free Baking method [Valflon (registered trade mark) No. 7000 manufactured and sold by Nippon Valqua Industry Ltd., Japan; each of the sheets has a specific gravity of 2.16 and a number average molecular weight of about $1 \times 10^7$] were each preheated, and compressed using a compression press as illustrated in FIG. 3 provided with opposing dies having a temperature of 260° C. Before compressing the preformed sheets, the inner surfaces of the opposing dies had been lubricated by means of a silicone oil (KF 965 manufactured and sold by Shinetsu Silicone K.K., Japan, which has a viscosity of about 10,000 cps at 25° C.). In compressing the preformed sheets, a 0.1 mm thick film of polytetrafluoro-

TABLE 6

| Sample | Temp. (°C.) for orientation Preform* | Temp. (°C.) for orientation Dies 1 | Temp. (°C.) for free shrinkage | Average maximum expansion ratio (D) | Least maximum shrinkage ratio | ORS* (kg/cm²) | Shrinking starting temp. (°C.) in TMA* | Moisture permeability (g/m² · 24 hr) | Oxygen Permeability (ml/m² · day · atm) |
|---|---|---|---|---|---|---|---|---|---|
| Example 16 | 260 | 260 | 220 | 3.3 | 0.56 | 0 | 175 | 0.48 | 3750 |
| Comparative example 20 | 260 | 260 | no free shrinkage | 3.3 | 0.56 | 16 | 50 | 0.49 | 3710 |
| Comparative example 21 | no orientation | | no free shrinkage | 1 | 1.0 | 0 | no shrinkage | 1.18 | 7600 |

*Preform, ORS and TMA are as mentioned in Table 1.

EXAMPLE 17 AND COMPARATIVE EXAMPLES 22 AND 23

A preformed polytetrafluoroethylene sheet containing a glass fiber in an amount of about 20% by weight [Valflon (registered trade mark) glass-filled, No. 7000-2NO, manufactured and sold by Nippon Valqua Industry Ltd., Japan] was multiaxially oriented so as to have an average maximum expansion ratio of about 5, and subjected to heat treatment at 220° C. for free shrinkage, in substantially the same manner as described in Example 1, thereby obtaining an oriented sheet (Example 17).

Then, substantially the same procedures as described above were repeated except that the heat treatment for free shrinkage was not conducted, thereby obtaining an oriented sheet (Comparative Example 22). A non-oriented preformed polytetrafluoroethylene sheet containing a glass fiber as defined above was used as a control (Comparative Example 23). The orientation conditions and the test results with respect to the properties of Samples of Example 17 and Comparative Examples 22 and 23 are shown in Table 7.

As is apparent from Table 7, the shaped article of the present invention containing a glass fiber as the filing ethylene was disposed between the upper surface of the preformed sheet and the inner surface of the upper die and between the lower surface of the preformed sheet and the inner surface of the lower die. The hot/cold die plate 11 of the compression press was set at room temperature. Thus, there were obtained oriented polytetrafluoroethylene sheet articles (Comparative Examples 25 to 28) having various average maximum expansion ratios as indicated in Table 8. The thickness of each of the oriented polytetrafluoroethylene sheet articles was about 2 mm. A non-oriented preformed polytetrafluoroethylene sheet Valfron No. 7000 mentioned above was used as a control (Comparative Example 24). Next, the thus obtained sheets were subjected to heat treatment for free shrinkage at 80° C., 150° C. and 220° C. for 2 hours, thereby obtaining oriented sheets (Comparative Example 29, Comparative Example 30, and Example 18, respectively). The orientation conditions and shrinking treatment conditions and the test results with respect to the properties of Samples of Example 18 and Comparative Examples 24 to 30 are shown in Table 8.

The features of the shaped article of the present invention are now explained in detail with reference to FIGS. 14 to 16.

Figure 14:
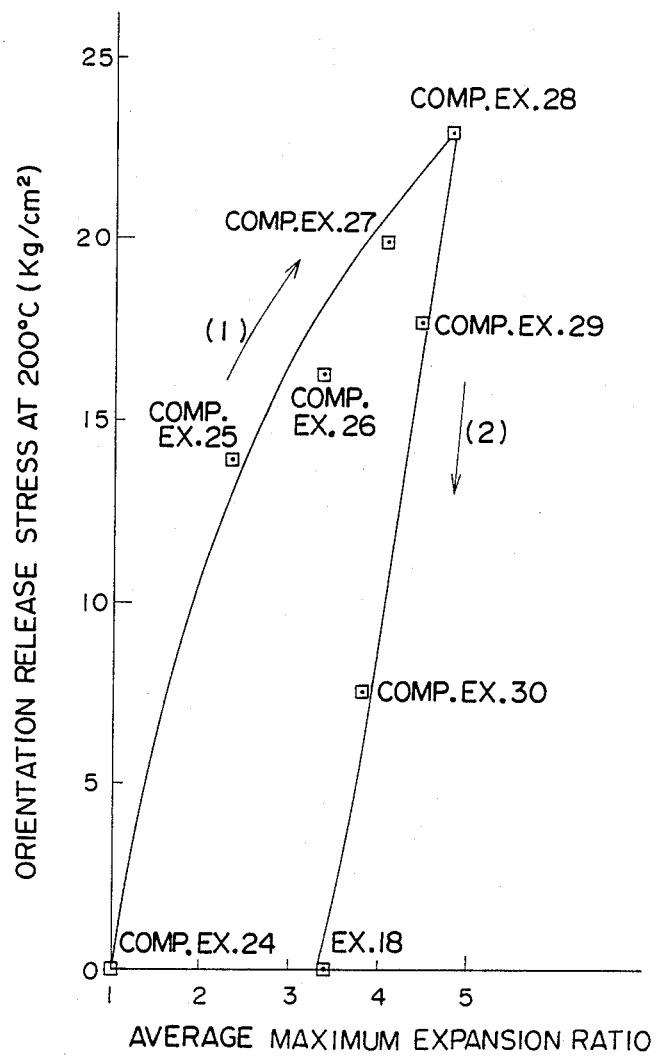
FIG. 14 is a graph showing the relationship between the orientation release stress and the average maximum expansion ratio with respect to the shaped articles obtained in Example 18 and Comparative Examples 24–30 as will be described later.

With respect to the above-mentioned sheets, the orientation release stress values at 200° C. are plotted against the average maximum expansion ratio values in FIG. 14. As indicated by an arrow (1) in the graph of FIG. 14, the orientation release stress increases with the increase of the average maximum expansion ratio thereof (Comparative Examples 24 to 28). Shrinking treatment of the sheet of Comparative Example 28 gives oriented sheets (Comparative Examples 29 and 30) having orientation release stress values which are along an arrow (2) in the graph of FIG. 14. The arrows (1) and (2) form a hysteresis curve.

Figure 15:
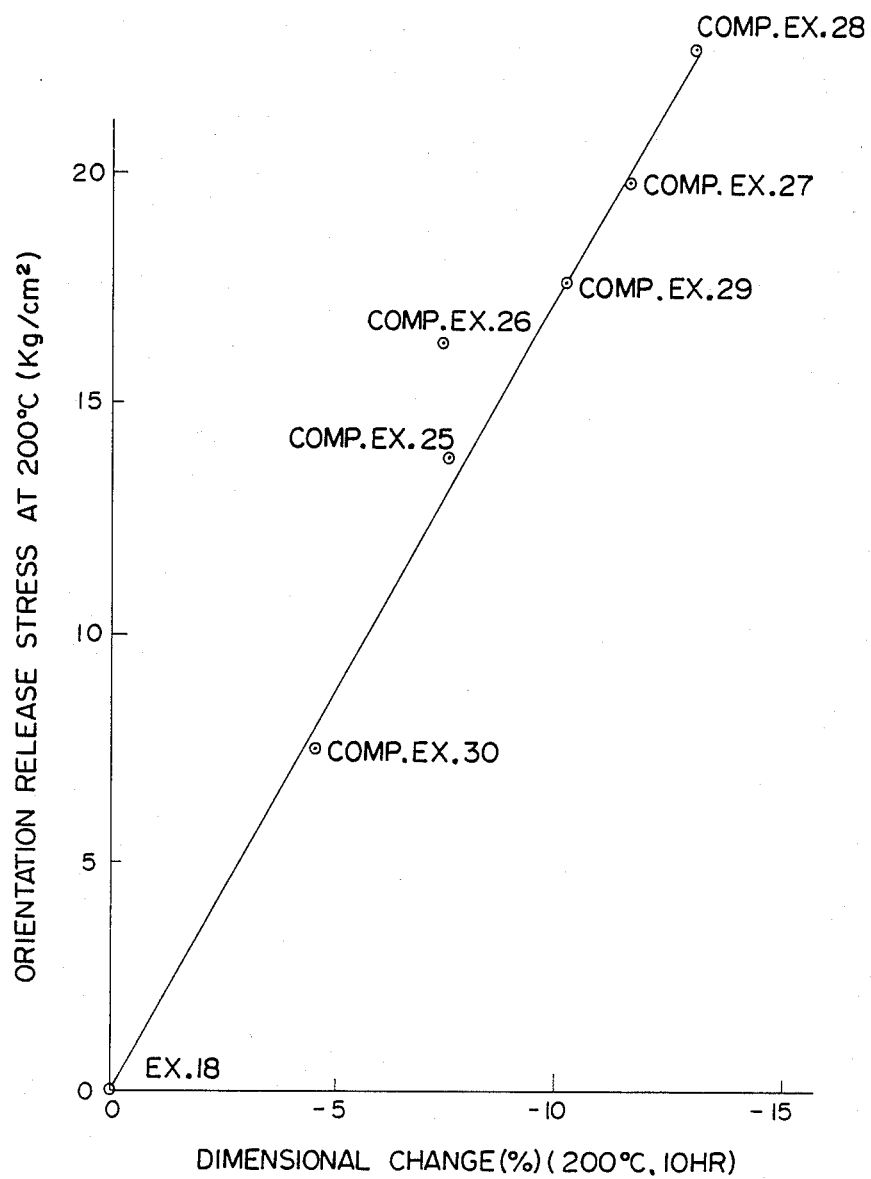
FIG. 15 is a graph showing the relationship between the dimensional change and the orientation release stress with respect to the shaped articles obtained in Example 18 and Comparative Examples 25–30 as will be described later, from which relationship it is apparent that the smaller the value of orientation release stress, the smaller the dimensional change.

With respect to the oriented sheets of Example 18 and Comparative Examples 25 to 30, the orientation release stress values as measured at 200° C. are plotted against the dimensional change values as measured at 200° C. for 10 hours in FIG. 15. As shown in FIG. 15, the shaped article of the present invention has a dimensional change of 0, that is, is excellent in dimensional stability.

Figure 16:
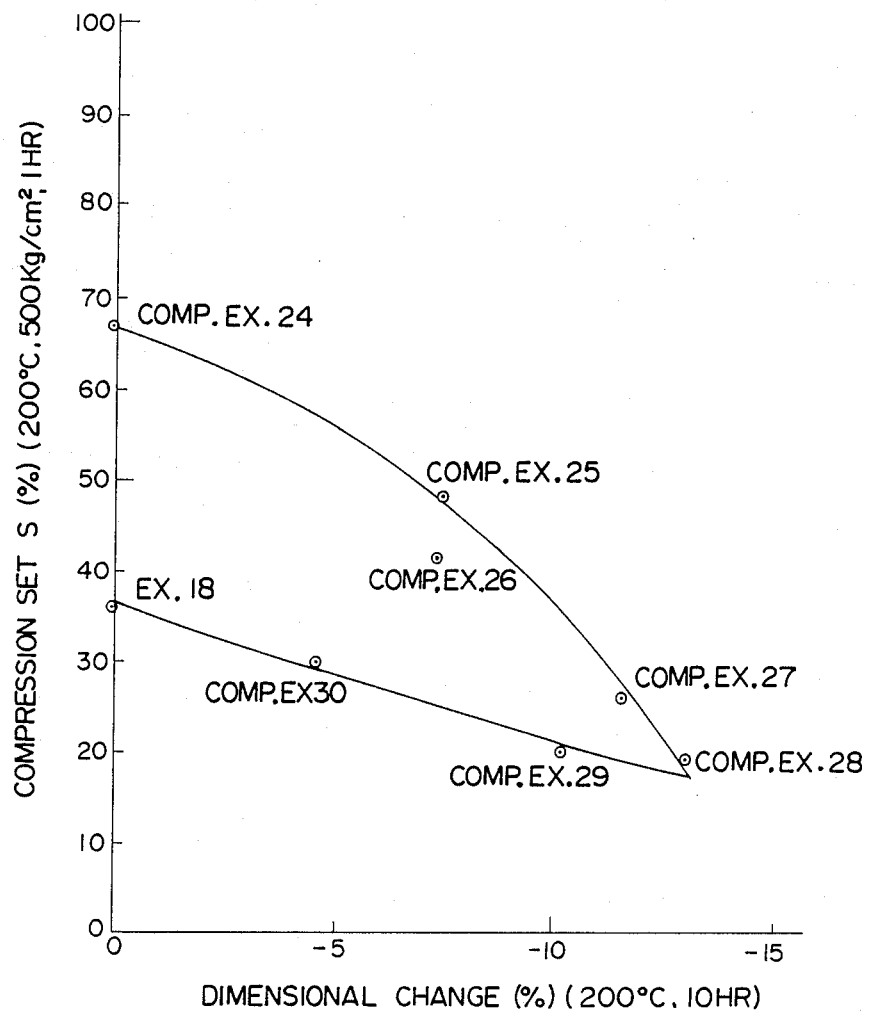
FIG. 16 is a graph showing the relationship between the compression set and the dimensional change with respect to the shaped articles obtained in Example 18 and Comparative Examples 24–30 as will be described later, from which relationship it is apparent that the shaped article of the present invention exhibits advantageously low compression set and dimensional change as compared to the comparative shaped articles.

With respect to the oriented sheets of Example 18 and Comparative Examples 24 to 30, the compression set values as measured at 200° C. under 500 Kg/cm² for 1 hour are plotted against the dimensional change values as measured at 200° C. for 10 hours in FIG. 16.

As is apparent from FIGS. 14 to 16, the shaped article of the present invention has excellent compression creep resistant properties and dimensional stability.

EXAMPLES 19 TO 24

Substantially the same procedures as described in Example 18 were repeated except that the temperature for orientation and that for free shrinkage were varied as indicated in Table 9 to obtain oriented sheets of Examples 19 to 24. The orientation conditions and the test results with respect to the properties of the thus obtained sheets are shown in Table 9.

COMPARATIVE EXAMPLES 31 TO 35

Substantially the same procedures as described in Comparative Examples 24 to 30 were repeated except that the temperature for orientation and that for free shrinkage were varied as indicated in Table 9 to obtain oriented sheets of Comparative Examples 31 to 35. The orientation conditions and the test results with respect to the properties of the thus obtained sheets are shown in Table 9.

As is apparent from Table 9, the shaped article of the present invention has excellent compression creep resistant properties and dimensional stability.

TABLE 9

| Sample | | Temp. (°C.) for orientation Preform* | Dies 1 | Temp. (°C.) for free shrinkage | Average maximum expansion ratio (D) | ORS* (kg/cm²) | Compression Set (%) | Degree of dimensional change (%) | Specific gravity (g/cm³) | Least maximum shrinkage ratio |
|---|---|---|---|---|---|---|---|---|---|---|
| Example | 19 | 220 | 220 | 220 | 2.9 | 0 | 43 | 0 | 2.16 | 0.59 |
| | 20 | 260 | 260 | 220 | 3.4 | 0 | 37 | 0 | 2.16 | 0.56 |
| | 21 | 300 | 300 | 220 | 3.7 | 0 | 31 | 0 | 2.16 | 0.53 |
| | 22 | 260 | 260 | 220 | 2.2 | 0 | 51 | 0 | 2.16 | 0.71 |
| | 23 | 260 | 260 | 200 | 3.4 | 1 | 35 | −0.6 | 2.16 | 0.56 |
| | 24 | 260 | 260 | 180 | 3.6 | 3 | 34 | −1.8 | 2.16 | 0.56 |
| Comparative Example | 31 | 220 | 220 | no free shrinkage | 3.2 | 18 | 44 | −5.6 | 2.16 | 0.59 |
| | 32 | 260 | 260 | no free shrinkage | 3.4 | 16 | 42 | −7.5 | 2.16 | 0.56 |
| | 33 | 300 | 300 | no free shrinkage | 3.7 | 10 | 33 | −9.2 | 2.16 | 0.53 |
| | 34 | 260 | 260 | no free shrinkage | 2.3 | 13 | 49 | −7.5 | 2.16 | 0.67 |
| | 35 | 260 | 260 | 170 | 3.9 | 7 | 31 | −4.0 | 2.16 | 0.53 |

*Preform and ORS are as mentioned in Table 1.

EXAMPLE 25

A preformed polytetrafluoroethylene sheet having a thickness of 13 mm as manufactured according to the Free Baking method [Valflon (registered trade mark) No. 7000 manufactured and sold by Nippon Valqua Industry Ltd., Japan which has a specific gravity of 2.16 and a number average molecular weight of about

TABLE 8

| Sample | | Temp. (°C.) for orientation Preform* | Dies 1 | Temp. (°C.) for free shrinkage | Average maximum expansion ratio (D) | ORS* (kg/cm²) | Compression set (%) | Degree of dimensional change (%) | Specific gravity (g/cm³) | Least maximum shrinkage ratio |
|---|---|---|---|---|---|---|---|---|---|---|
| Example | 18 | 260 | 260 | 220 | 3.4 | 0 | 37 | 0 | 2.16 | 0.56 |
| Comparative Example | 24 | no orientation | | no free shrinkage | 1 | 0 | 67 | −0.4 | 2.16 | 1.00 |
| | 25 | 260 | 260 | no free shrinkage | 2.4 | 14 | 49 | −7.5 | 2.16 | 0.67 |
| | 26 | 260 | 260 | no free shrinkage | 3.4 | 16 | 42 | −7.4 | 2.16 | 0.56 |
| | 27 | 260 | 260 | no free shrinkage | 4.1 | 20 | 27 | −11.6 | 2.16 | 0.50 |
| | 28 | 260 | 260 | no free shrinkage | 4.8 | 23 | 20 | −13.0 | 2.16 | 0.48 |
| | 29 | 260 | 260 | 80 | 4.5 | 18 | 21 | −10.2 | 2.16 | 0.48 |
| | 30 | 260 | 260 | 150 | 4.0 | 8 | 30 | −4.6 | 2.16 | 0.50 |

*Preform and ORS are as mentioned in Table 1.

$1 \times 10^7$] was preheated to 220° C., and compressed using a compression press as illustrated in FIG. 3 provided with opposing dies having a temperature of 220° C. Then, the compressed sheet having a temperature of 220° C. was taken out of the dies, and allowed to cool to room temperature for free shrinkage. Thus, there was obtained an oriented polytetrafluoroethylene sheet article having an average maximum expansion ratio of 3.3 and a thickness of 3.9 mm.

The orientation conditions and the test results with respect to the properties of the above obtained oriented sheet are shown in Table 10. As is apparent from Table 10, the shaped article of the present invention has excellent dimensional stability, with excellent compression creep resistant properties maintained.

TABLE 10

| Sample | Temp. (°C.) for orientation Preform* | Temp. (°C.) for orientation Dies 1 | Takeout Temp. (°C.) of article | Average maximum expansion ratio (D) | ORS* (kg/cm$^2$) | Compression set (%) | Degree of demensional change (%) | Specific gravity (g/cm$^3$) | Least maximum shrinkage ratio |
|---|---|---|---|---|---|---|---|---|---|
| Example 25 | 220 | 220 | 220 | 3.3 | 0 | 39 | 0 | 2.16 | 0.56 |

*Preform and ORS are as mentioned in Table 1.

What is claimed is:

1. A shaped article comprising a tetrafluoroethylene polymer having a number average molecular weight of at least about $10^6$, which article has a specific gravity of at least 1.8 and an orientation release stress at 200° C. of less than 5 Kg/cm$^2$, and which article has a shrinking starting temperature of at least 80° C. as measured by thermomechanical analysis and has heat shrinking properties such that upon heating to a temperature higher than the shrinking starting temperature, shrinking occurs in a plurality of planes contiguously aligned in substantially parallel relationship within the shaped article and simultaneously expansion occurs in a direction perpendicular to said planes, wherein said shaped article exhibits an average maximum expansion ratio of from 2 to 10 as measured in terms of a ratio of a maximum expansion in the direction perpendicular to said planes and a least maximum shrinkage ratio of 0.71 or less as measured in terms of a ratio of a maximum shrinkage in a direction in which the maximum shrinkage is least.

2. The shaped article according to claim 1, wherein said average maximum expansion ratio is in the range of from 3 to 7.

3. The shaped article according to claim 1, wherein said specific gravity is at least 2.0.

4. The shaped article according to claim 1, wherein said tetrafluoroethylene polymer is comprised of a homopolymer of tetrafluoroethylene or a copolymer of at least 70% by mole of tetrafluoroethylene and a comonomer, said homopolymer and said copolymer each having a number average molecular weight of from about $10^6$ to about $10^8$.

5. The shaped article according to claim 1, 2, 3 or 4 having incorporated therein at least one filler material selected from the group consisting of glass fiber, carbon fiber, graphite, carbon black, molybdenum disulfide, bronze, zirconium oxide, zirconium silicate, boron whisker, an aromatic polyamide fiber, an aromatic polyester fiber, polyphenylene sulfide, polysulfone, polyether-sulfone, polyamide-imide, aromatic polyimide, polyether-imide, polyether-ether-ketone and polyether ketone, said filler material being incorporated in an amount of up to 60% by weight, based on the total weight of the tetrafluoroethylene polymer and filler material.

6. The shaped article according to of claim 1, which is a sealant.

7. The shaped article according to claim 1, which is a lining material.

8. The shaped article according to claim 1, which is a bearing.

9. The shaped article according to claim 1, which is a bearing pad.

10. The shaped article according to claim 1, which is a sliding pad.

* * * * *